United States Patent
Miller et al.

(10) Patent No.: US 10,914,664 B1
(45) Date of Patent: Feb. 9, 2021

(54) INCLINED ROLLER OVEN FOR DYNAMIC SAG EVALUATION/DETERMINATION OF SETTLING VELOCITY

(71) Applicant: Halliburton Energy Services, Inc., Houston, TX (US)

(72) Inventors: Jeffrey James Miller, Spring, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/775,642

(22) Filed: Jan. 29, 2020

(51) Int. Cl.
*G01N 15/04* (2006.01)
*E21B 21/08* (2006.01)
*C09K 8/03* (2006.01)
*G01N 9/30* (2006.01)

(52) U.S. Cl.
CPC .......... *G01N 15/042* (2013.01); *C09K 8/032* (2013.01); *E21B 21/08* (2013.01); *G01N 9/30* (2013.01); *G01N 2291/02416* (2013.01); *G01N 2291/02818* (2013.01); *G01N 2291/02872* (2013.01); *G01N 2291/02881* (2013.01)

(58) Field of Classification Search
CPC ................ G01N 15/04–042; G01N 2015/045
See application file for complete search history.

(56) References Cited

U.S. PATENT DOCUMENTS

| | | | | |
|---|---|---|---|---|
| 2,596,352 A | * | 5/1952 | Wuensch | G01N 9/26 137/91 |
| 2,845,793 A | * | 8/1958 | Cardwell, Jr. | E21B 49/005 73/61.65 |
| 4,769,830 A | * | 9/1988 | Peterson | G01N 23/10 378/54 |
| 5,086,646 A | * | 2/1992 | Jamison | G01N 9/00 73/65.01 |
| 6,330,826 B1 | | 12/2001 | Meeten | |
| 6,584,833 B1 | * | 7/2003 | Jamison | E21B 49/005 73/61.63 |
| 6,931,916 B2 | | 8/2005 | Zamora et al. | |
| 7,845,212 B1 | | 12/2010 | Bi | |
| 8,476,201 B2 | | 7/2013 | Miller et al. | |
| 8,640,530 B2 | | 2/2014 | Jamison et al. | |

(Continued)

FOREIGN PATENT DOCUMENTS

WO    2011083319 A1    7/2011

OTHER PUBLICATIONS

Pressurized Sag Cup Instruction Manual. (2014). Houston, TX: Fann Instrument Company. (Year: 2014).*

(Continued)

*Primary Examiner* — Alexander A Mercado
(74) *Attorney, Agent, or Firm* — Conley Rose, P.C.; Rodney B. Carroll

(57) ABSTRACT

A method for dynamically evaluating sag of a fluid by providing a test volume of the fluid into an angled sample chamber, wherein the angled sample chamber has a central axis, and wherein the central axis of the angled sample chamber is angled relative to horizontal, rotating the sample chamber about the central axis for a test period, and determining a sag density, wherein the sag density is a density of a fluid sample taken at a sample location within a stratum of the test volume of the fluid present in the angled sample chamber.

21 Claims, 10 Drawing Sheets

(56) References Cited

U.S. PATENT DOCUMENTS

| | | | |
|---|---|---|---|
| 9,187,966 B2 | 11/2015 | Kulkarni et al. | |
| 9,341,556 B2 | 5/2016 | Jamison et al. | |
| 9,513,203 B2 | 12/2016 | Kulkarni et al. | |
| 10,202,843 B2 | 2/2019 | Wroblewski et al. | |
| 2011/0167901 A1* | 7/2011 | Jamison | G01N 9/36 |
| | | | 73/152.18 |
| 2012/0020457 A1* | 1/2012 | Cahill | G01F 23/288 |
| | | | 378/52 |
| 2012/0227475 A1* | 9/2012 | Troxler | G01B 21/20 |
| | | | 73/73 |
| 2012/0304763 A1* | 12/2012 | Troxler | G01B 11/24 |
| | | | 73/32 R |
| 2013/0003917 A1* | 1/2013 | Kim | G01N 23/046 |
| | | | 378/19 |
| 2013/0048623 A1* | 2/2013 | Jamison | G01N 33/383 |
| | | | 219/389 |
| 2013/0053284 A1* | 2/2013 | Jamison | G01N 33/24 |
| | | | 507/200 |
| 2013/0202078 A1* | 8/2013 | Lee | G01N 9/24 |
| | | | 378/10 |
| 2013/0332089 A1* | 12/2013 | Kulkarni | G01N 11/00 |
| | | | 702/50 |
| 2014/0202772 A1* | 7/2014 | Kulkarni | E21B 21/08 |
| | | | 175/65 |
| 2015/0354343 A1* | 12/2015 | Wroblewski | G01N 29/028 |
| | | | 73/152.18 |
| 2016/0123861 A1* | 5/2016 | Scheibelmasser | G01N 9/002 |
| | | | 73/32 A |
| 2016/0238504 A1 | 8/2016 | Jamison et al. | |
| 2017/0292902 A1* | 10/2017 | Bardapurkar | G01N 13/00 |
| 2020/0232966 A1* | 7/2020 | Beaupre | G01N 9/16 |

OTHER PUBLICATIONS

Zamora, Mario, et al., "Improved Wellsite Test for Monitoring Barite Sag," AADE Drilling Fluids Technical Conference, AADE-04-DF-HO-19, 2004, pp. 1-15.

Sag Shoe Assembly Instruction Manual, #130-22, Instruction Manual, Oct. 19, 2017, Version 2.0, OFI Testing Equipment, Inc, OFITE 2015.

Pressurized Sag Cup Instruction Manual, Manual No. D00960092, Revision A, Instrument No. 102432866, Fann Instrument Company, Aug. 2014.

Foreign Communication from Related Application—International Search Report and Written Opinion of the International Searching Authority, International Application No. PCT/US2020/018521, dated Oct. 20, 2020, 13 pages.

* cited by examiner

US 10,914,664 B1

INCLINED ROLLER OVEN FOR DYNAMIC SAG EVALUATION/DETERMINATION OF SETTLING VELOCITY

TECHNICAL FIELD

The present disclosure relates generally to systems and methods for fluid rheology measurements, for example dynamic sag evaluation of a wellbore servicing fluid.

BACKGROUND

Fluids used in wellbore servicing operations may contain a variety of additives, including without limitation barite that may be used as a weighting agent or material in drilling fluids. Barite sag, the localized concentration of weighting agent, is caused by complex fluid dynamics during drilling operations. Most often the phenomenon occurs in inclined wellbores during trips or casing/liner runs when low fluid flow velocity conditions persist downhole. Barite sag is a serious issue because the resulting uneven density of the fluid column in the wellbore can compromise the operator's ability to easily control well pressures. Fluids which can avoid barite sag present a major benefit in terms of safety and reliability, as well a huge economic advantage due to efficiency gains, both in well designs to maximize reservoir exposure and the spend to execute drilling programs.

BRIEF SUMMARY OF THE DRAWINGS

For a more complete understanding of this disclosure, reference is now made to the following brief description, taken in connection with the accompanying drawings and detailed description, wherein like reference numerals represent like parts.

Figure 2A:
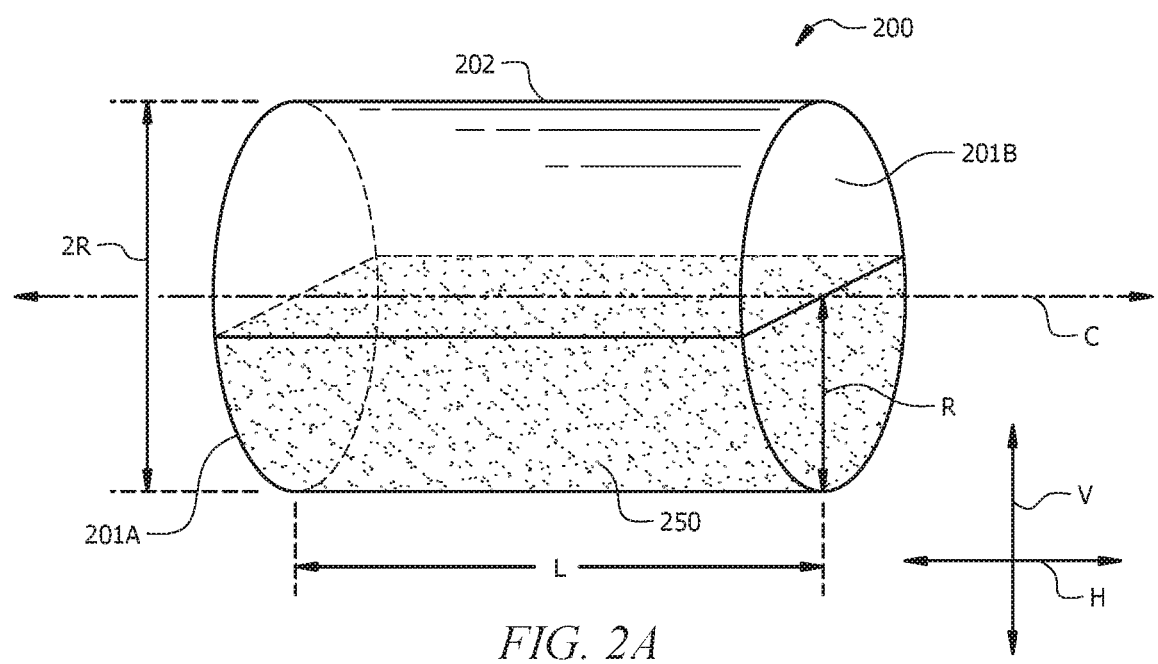
FIG. 2A is a schematic of a sample chamber containing therein a test volume of fluid.
Figure 4A:
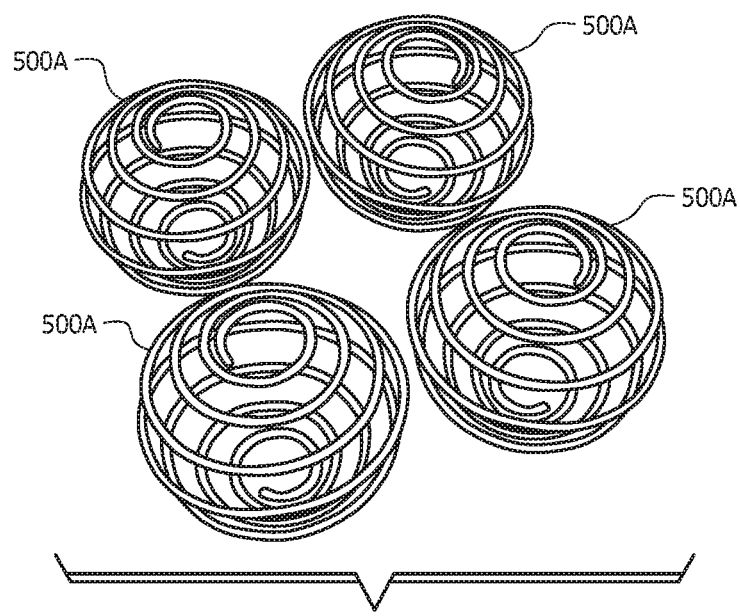
FIG. 4A is a schematic representation of spring objects which can be utilized as the object.
Figure 4B:
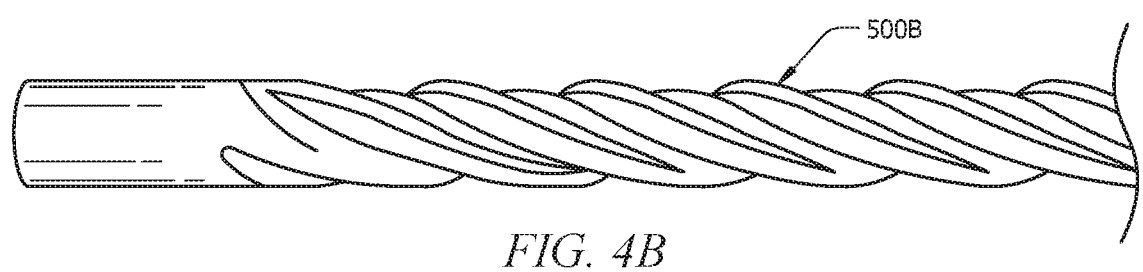
FIG. 4B is a schematic representation of a rotor object which can be utilized as the object.

With reference to the figures, a descriptor numeral can be utilized generically herein to refer to any embodiment of a component denoted by said descriptor numeral. For example, generic reference to an "object 500" can indicate any suitable object 500, such as spring objects 500A, as depicted in FIG. 4A described hereinbelow, and rotor objects 500B, as depicted in FIG. 4B described hereinbelow. By way of further example, generic reference to a stratum S can include a first stratum S1 containing a lower ½, a second stratum S2 containing a lower ⅓, a third stratum S3 containing a lower ¼, a fourth stratum S4 containing an upper ½, a fifth stratum S5 containing an upper ⅓, or a sixth stratum S6 containing an upper ¼ of the volume of the test volume of fluid 250 in the angled sample chamber 200A, as depicted in FIG. 2C described hereinbelow.

DETAILED DESCRIPTION

It should be understood at the outset that although an illustrative implementation of one or more specific embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Herein disclosed are a system and method for dynamic sag evaluation of fluids, including without limitation wellbore servicing fluids such as drilling fluids comprising a weighting agent (e.g., barite). "Dynamic" indicates that the fluid being evaluated for sag is in motion, and is not static during a test period of the method. The system and method utilize an angled sample chamber (also referred to as an "inclined sample chamber") operable as an aging cell. A roller oven can be utilized to rotate the angled sample chamber at a desired angle for a test period, after which a sag density of the fluid at a sample location in the sample chamber can be determined. The sag density can be measured ex situ utilizing, for example, a pressurized density measurement cell; in situ utilizing, for example, a sensor; or a combination thereof.

As noted hereinabove, a method for dynamic sag evaluation of a fluid is disclosed herein. Description of the method will now be made with reference to FIG. 1, which is a schematic flow diagram of a method 100, according to one or more specific embodiments of this disclosure. Method 100 includes: providing a test volume of the fluid in an angled sample chamber at 110; rotating the sample chamber about a central axis for a test period at 120; and determining a sag density at 130. The method can further include: comparing the sag density to an initial density of the test volume of the fluid provided to the sample chamber, as indicated at 135; determining the initial density of the test volume of fluid, as indicated at 105; and/or providing an object within the angled sample chamber, as indicated at 115. In one or more specific embodiments, the fluid includes a weighted wellbore servicing fluid having a weighting agent, such as, without limitation, barite disposed therein. Accordingly, although description provided hereinbelow can refer to such a weighted wellbore servicing fluid, any fluid for which a sag evaluation is desired can be utilized.

Method 100 includes providing a test volume of fluid into an angled sample chamber 110. FIG. 2A is a schematic of a sample chamber 200 containing therein a test volume of fluid 250. Sample chamber 200 includes a first end 201A and a second end 201B, with curved walls 202 having length L extending therebetween. In the embodiment of FIG. 2A, sample chamber 200 is cylindrical in shape, having a circular cross-section with a radius R and a diameter 2R, however, sample chambers having other shapes and/or cross-sections (e.g., rectangular, rectilinear) can be utilized, in one or more specific embodiments. A cylindrical sample chamber having curved walls 202 can be desirable, however, to promote rotating (e.g., rolling) of the sample chamber at 120. Sample chamber 200 has a central axis, C.

Figure 2B:
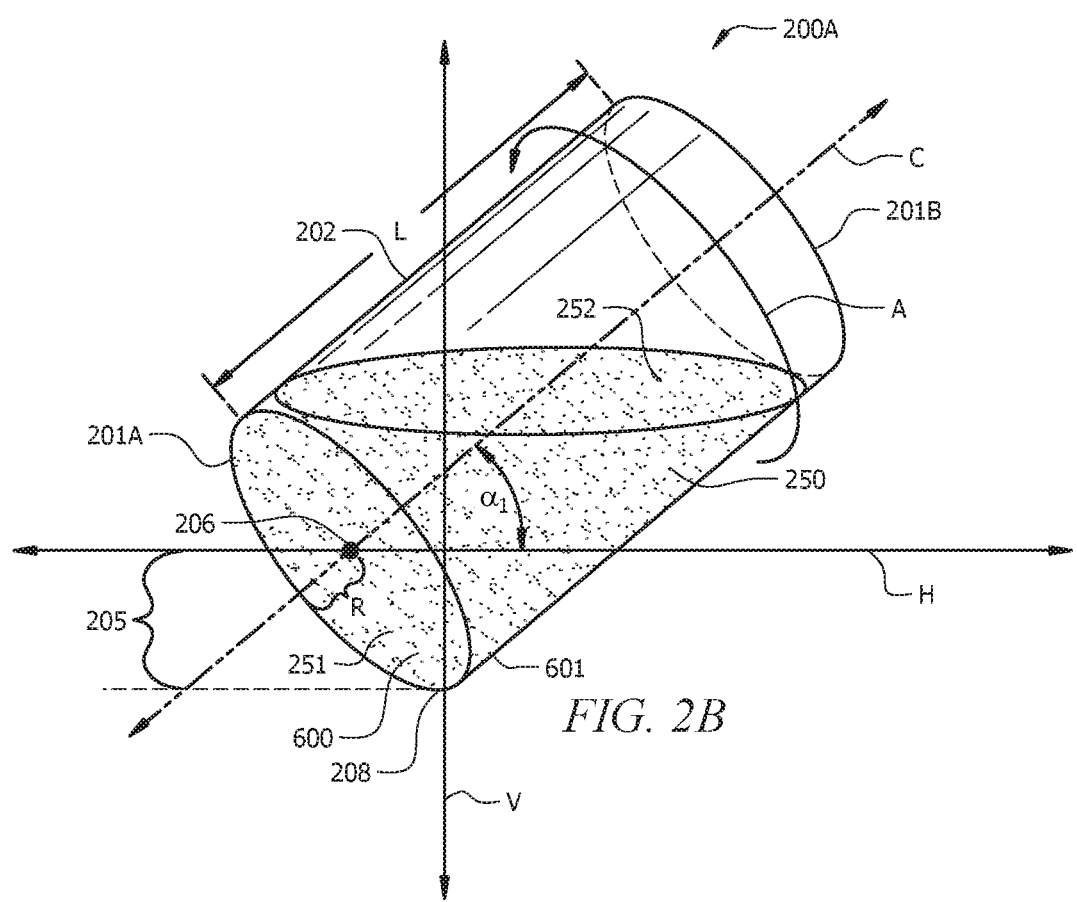
FIG. 2B is a schematic of an angled sample chamber which includes the sample chamber of FIG. 2A positioned such that it is angled relative to horizontal H by an angle $\alpha_1$ (also referred to herein as an angled sample chamber angle $\alpha_1$) between central axis C of the sample chamber and horizontal H.
Figure 2C:
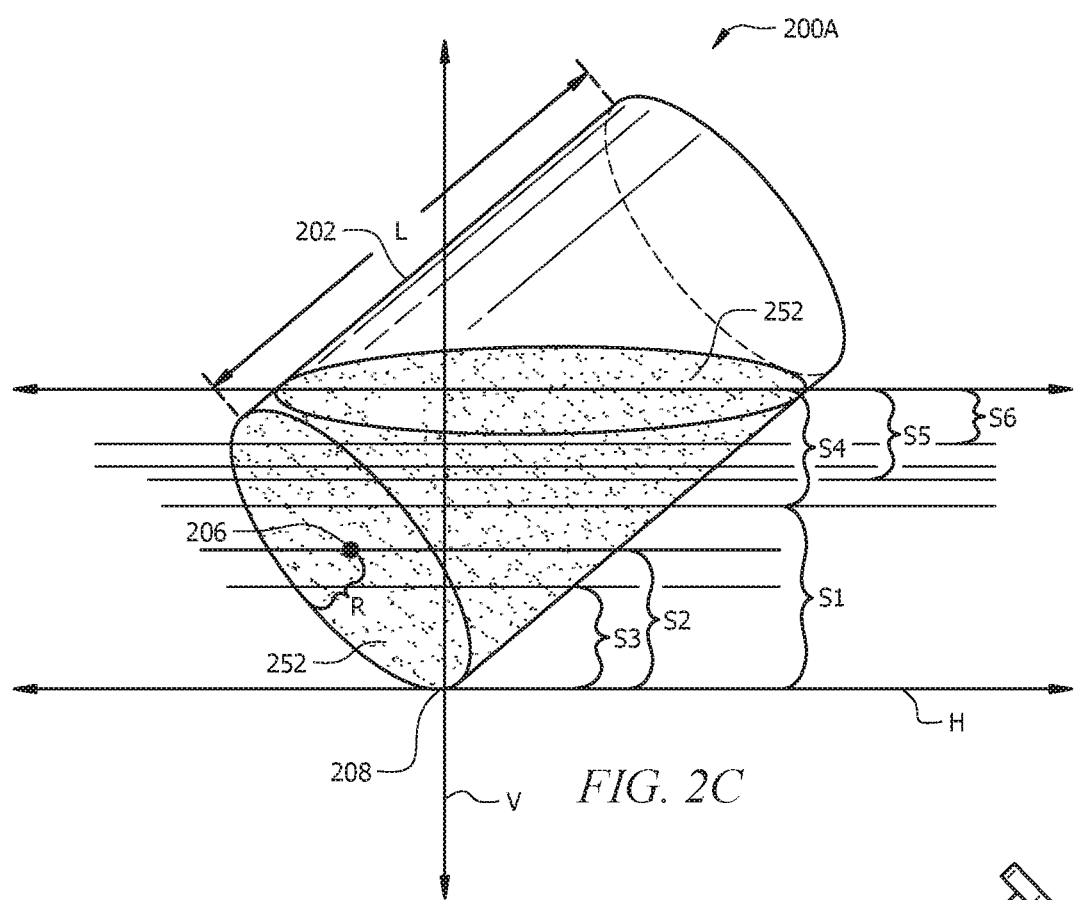
FIG. 2C is a schematic of the angled sample chamber of FIG. 2B showing strata S.

FIG. 2B is a schematic of angled sample chamber 200A, which is the sample chamber 200 of FIG. 2A positioned such that it is angled relative to horizontal H by an angle $\alpha_1$ (also referred to herein as an angled sample chamber angle $\alpha_1$) between central axis C and horizontal H. Providing the test volume of fluid 250 in the angled sample chamber 200A can include placing the test volume of fluid in a sample chamber 200 (e.g., when central axis C thereof is coincident with horizontal H or vertical V), and subsequently angling the sample chamber 200 relative to horizontal H (e.g., and vertical V) to provide the angled sample chamber 200A having the angled sample chamber angle $\alpha_1$ between central axis C thereof and horizontal H (and an angle 90 minus $\alpha_1$ between central axis C thereof and vertical V), thus providing the test volume of fluid 250 in angled sample chamber 200A. Alternatively or additionally, providing the test volume of fluid 250 in the angled sample chamber 200A can include placing a sample chamber 200 such that the angled sample chamber angle $\alpha_1$ is provided between central axis C thereof and horizontal H (e.g., and an angle 90 minus $\alpha_1$ is provided between central axis C thereof and vertical V) to provide the angled sample chamber 200A (e.g., which central axis C thereof is not coincident with horizontal H or vertical V), and subsequently placing the test volume of fluid 250 in the angled sample chamber 200A to provide the test volume of fluid 250 in the angled sample chamber 200A. The central axis C of angled sample chamber 200A can be angled from horizontal H at an angle $\alpha_1$ in a range of from about 1 to about 85 degrees, from about 10 to about 85 degrees, from about 15 to about 75 degrees, from about 15 to about 70 degrees, and/or greater than or equal to about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, or 80 degrees. Positioning sample chamber 200 at an angle or incline to provide angled sample chamber 200A can help to induce Boycott settling effects and help trap heavier settled particles during rotating of the angled sample chamber about the central axis C thereof for the test period at 130.

When in the angled sample chamber 200A, the test volume of fluid 250 assumes the shape of the angled sample chamber 200A, with a top 252 of the test volume of fluid 250 distal a lowest point 208 of angled sample chamber 200A, and a bottom 251 of the test volume of fluid 250 positioned in a lowest region 205 within angled sample chamber 200A. Lowest region 205 of angled sample chamber 200A can include a region within angled sample chamber 200A below, for example, a horizontal plane passing through angled sample chamber such that ½, ⅓, or ¼ of a volume of the test volume of fluid 250 in angled sample chamber 200A is below the plane. For example, a lowest region 205 of angled sample chamber 200A can include a region within angled sample chamber 200A below, for example, a horizontal plane passing through center 206 of first end 201A (e.g., bottom) of angled sample chamber 200A.

As depicted in FIG. 2C, which is a schematic of the angled sample chamber 200A of FIG. 2B, angled sample chamber 200A can be divided into strata S, which are regions within angled sample chamber 200A. For example, a first stratum S1 can be a stratum containing a lower half (½) of a volume of the test volume of fluid 250 in angled sample chamber 200A; a second stratum S2 can be a stratum containing a lower third (⅓) of the volume of the test volume of fluid 250 in angled sample chamber 200A; and a third stratum S3 can be a stratum containing a lower quarter (¼) of a volume of the test volume of fluid 250 in angled sample chamber 200A. Similarly, a fourth stratum S4 can be a stratum containing an upper half (½) of a volume of the test volume of fluid 250 in angled sample chamber 200A; a fifth stratum S5 can be a stratum containing an upper third (⅓) of the volume of the test volume of fluid 250 in angled sample chamber 200A; and a sixth stratum S6 can be a stratum containing an upper quarter (¼) of a volume of the test volume of fluid 250 in angled sample chamber 200A. As will be apparent to one of skill in the art, other strata designations are possible and within the scope of this disclosure.

The volume of the test volume of fluid 250 can be greater than, less than, or equal to about 250, 300, or 350 cm$^3$. In one or more specific embodiments, the volume of the test volume of fluid 250 can be less than or about equal to a lab barrel (e.g., 350 cm$^3$). As discussed further hereinbelow, lowest region 205 of angled sample chamber 200A can provide a trap 600.

The test volume of fluid 250 can be substantially homogeneous when provided into the sample chamber 200 and/or the angled sample chamber 200A. Alternatively, the test volume of fluid 250 can be homogenized subsequent being introduced into the sample chamber 200 and/or the angled sample chamber 200A.

Figure 1:
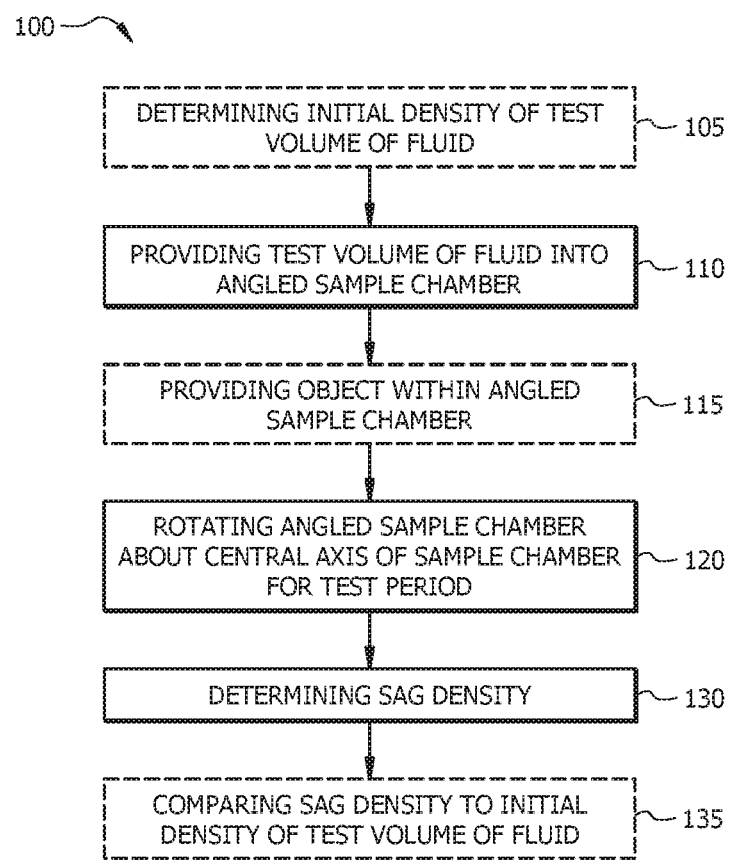
FIG. 1 is a schematic flow diagram of a dynamic sag evaluation method, according to one or more specific embodiments of this disclosure.

As depicted in the embodiment of FIG. 1, a method of this disclosure can further include determining the initial density of the test volume of fluid 250 at 105. Determining the initial density of the test volume of fluid 250 at 105 can be effected prior to or subsequent to providing the test volume of fluid 250 into the sample chamber 200 and/or the angled sample chamber 200A.

The dynamic sag evaluation method 100 can further include providing an object within the angled sample chamber 200A (e.g., via addition to sample chamber 200 prior to angling thereof relative to horizontal H and/or vertical V or via addition of the object to an already angled sample chamber 200A). The object is configured to disrupt a gelling ability of the fluid. The gelling ability can be measured by the gel strength, for example, via API Standard RP 10B-6 (ISO 10426-6:2008). The gel strength is the shear stress measured at a low shear rate after a fluid (e.g., a drilling mud) has been allowed to rest quiescently for a period of time. Rolling one or more objects inside the angled sample chamber 200A during rotation thereof at 120 can be utilized to further disrupt the formation of gel strengths and induce sag.

The object can be, for example and without limitation, a barstock rod, a threaded bar, a spiraled spring, a marble, a ball bearing, a rotor, a 6-legged "jack", or a combination thereof. Object(s) having non-uniform shapes can be utilized to achieve even greater disruption of the fluid's ability to gel. For example, threaded steel bars or even spiraled spring steel can be used. FIG. 4A is a schematic representation of spring objects 500A (e.g., a coil compression spring configured in the shape of a sphere or ball), which can be utilized as the object. FIG. 4B is a schematic representation of a rotor object 500B, similar to a large drill bit, which can be utilized as the object. The object can be made of any suitable material, for example steel. For example, spring object(s) 500A can be a steel spring object(s) 500A, rotor object 500B can be a steel rotor object 500B, and so on. In one or more specific embodiments, a plurality of (e.g., like or disparate) objects can be utilized.

The dynamic sag evaluation method 100 further includes rotating angled sample chamber 200A about central axis C thereof for a test period, as indicated by arrow A in FIG. 2B. Rotating (e.g., clockwise) can be provided by rolling the angled sample chamber 200A, for example on a support base comprising a pair of counter-rotating (e.g., counter-clockwise) support beams. The method 100 can further include maintaining the test volume of fluid 250 in the angled sample chamber 200A at a test temperature during all or a portion of the test period. The test temperature can be any temperature at which a sag evaluation of the fluid is desired. For example, and without limitation, the test temperature can be a temperature in a range of from about 25° C. to about 300° C.; from about 20° C. to about 200° C.; from about 25° C. to about 200° C.; from about 25° C. to about 150° C.; or greater than or equal to about 25° C., 50° C., or 75° C. and/or less than or equal to about 300° C., 200° C., or 150° C. For example, the test temperature can be greater than or equal to about 102° C. (215° F.), 99° C. (210° F.), or 93° C. (200° C.). As noted hereinabove, the fluid can include a weighted wellbore servicing fluid having a weighting agent (e.g., barite) disposed therein. In such applications, the test temperature can include a temperature of a wellbore in which the weighted wellbore servicing fluid will be, is being, or has been utilized downhole. The test period can be any time sufficient to provide sag evaluation. For example and without limitation, the test period can be a time in a range of from about 1 to about 48 h; from about 1 to about 24 h; from about 2 to about 24 h; from about 2 to about 16 h; from about 3 to about 12 h; from about 3 to about 5 h; or greater than or equal to about 1, 2, 3, 4, 5, or 6 h and/or less than or equal to about 48, 24, 20, 19, 18, 17, 16, 15, 14, 13, 12, 11, 10, 9, 8, 7, 6, 5, 4, 3, 2, or 1 h. To reach a test temperature without boiling the fluid, the sample chamber 200/angled sample chamber 200A can be sealed or pressurized. Thus, in one or more specific embodiments, sample chamber 200 has a lid or cover providing second end 201B thereof, while, in alternative embodiments, second end 201B is open.

The method can further include varying a speed and/or direction of the rotating during the test period at 120. In one or more specific embodiments, rotating includes oscillating, for example rotating in a direction as indicated by arrow A (e.g., clockwise) for a first time and then rotating in an opposite direction (e.g., counter-clockwise) for a second time period. Any number of time periods can be utilized, with rotating oscillating between rotation in the direction of arrow A and then in the direction opposite that indicated by arrow A, or vice versa, and so on. The rotating can be at a constant or variable speed.

During the test period, the test volume of fluid 250 in the angled sample chamber 200A can be subjected to a constant or variable shear rate. During the test period, the test volume of fluid 250 in the angled sample chamber 200A can be subjected to a range of from about 1 and about 45; from about 1 to about 30; from about 1 to about 20; or less than or equal to about 45, 40, 35, 30, 25, 20, 19, 18, 17, 16, 15, 14, 13, 12, 11, 10, 9, 8, 7, 6, or 5 revolutions per minute (rpm) about the central axis C of the angled sample chamber 200A relative to a point (e.g., a rotational timing mark or indicator) on the outside edge of the angled sample chamber 200A (e.g., relative to curved walls 202). A rate of the rotating of the angled sample chamber 200A during the test period can be adjusted such that the shear rate is sufficient to break a gel in the fluid. The rotational speed (e.g., revolutions per minute (rpm)) can be varied to a range of constant rates and (e.g., programmed) variable ramps of rotation rate can be utilized to break the gel of the fluid. By utilizing the angled or inclined sample chamber 200A, lower rolling speeds than conventional hot rolling (HR) testing can be utilized. Such conventional HR testing is described further in Comparative Example 2 hereinbelow.

Figure 3:
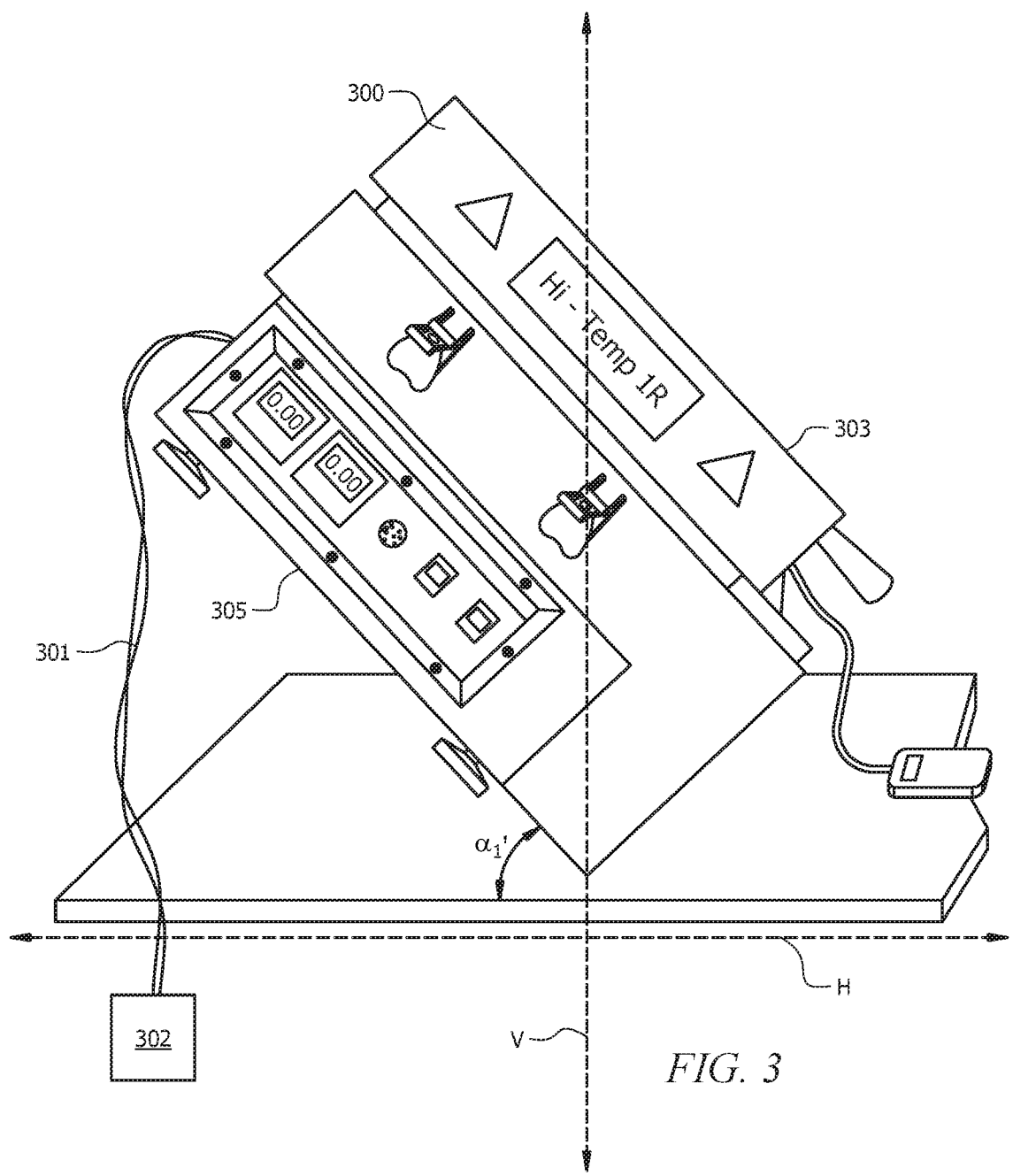
FIG. 3 is a schematic of an exemplary roller oven angled such that central axis C of a sample chamber is at a sample chamber angle of $\alpha_1$ relative to horizontal H when the sample chamber is positioned in the roller oven.

In one or more specific embodiments, the rotating of the angled sample chamber 200A at 120 is effected with an angled or inclined roller oven. For example, FIG. 3 is a schematic of an exemplary roller oven 300 angled such that, when positioned therein, the central axis C of sample chamber 200 is at an angle of $\alpha_1$ relative to horizontal H such that the sample chamber is angled to provide angled sample chamber 200A. A conventional roller oven 300 that provides rotation of a sample chamber at zero angle from horizontal H, for example, can be angled as depicted in FIG. 3 to provide an angled roller oven 300 having an angle $\alpha_1'$ (also referred to herein as a roller oven angle $\alpha_1'$) between a bottom 305 thereof and horizontal H. Angle $\alpha_1'$ at which roller oven 300 is angled can be equal (or not equal) to angle $\alpha_1$ between central axis C of angled sample chamber 200A and horizontal H, so long as roller oven 300 provides angle $\alpha_1$ between central axis C of angled sample chamber 200A and horizontal H when sample chamber 200 is positioned therein for rotating at 120. That is, an interior arrangement of roller oven can provide angle $\alpha_1$ between central axis C of angled sample chamber 200A and horizontal H of angled sample chamber 200A without angling of (e.g., an external housing 303 of) roller oven 300. For example and without limitation, a suitable roller oven is a FANN® 802P roller oven, available from Fann Instrument Company in Houston, Tex. Wires 301 can connect a voltage controller 302 with roller oven 300 (e.g., with a motor thereof) to allow for fine-tuning of the rotating speed. The roller oven may have other suitable controls (e.g., computerized controls) such as temperature control, speed control, test time control, etc.

A method of this disclosure further includes determining the sag density 130. As utilized herein, the "sag density" is a density of a fluid sample taken at a sample location (indicated as 210 in FIG. 2D) within a stratum S of the test volume of the fluid 250 present in the angled sample chamber 200A.

Determining the sag density 130 of the fluid sample at the sample location 210 can include determining the density of the fluid sample at the sample location 210 in situ, without removing the fluid sample from the angled sample chamber 200A. Alternatively or additionally, determining the sag density 130 of the fluid sample at the sample location 210 can include removing the fluid sample from the angled sample chamber 200A and determining the density of the removed fluid sample ex situ.

Figure 2D:
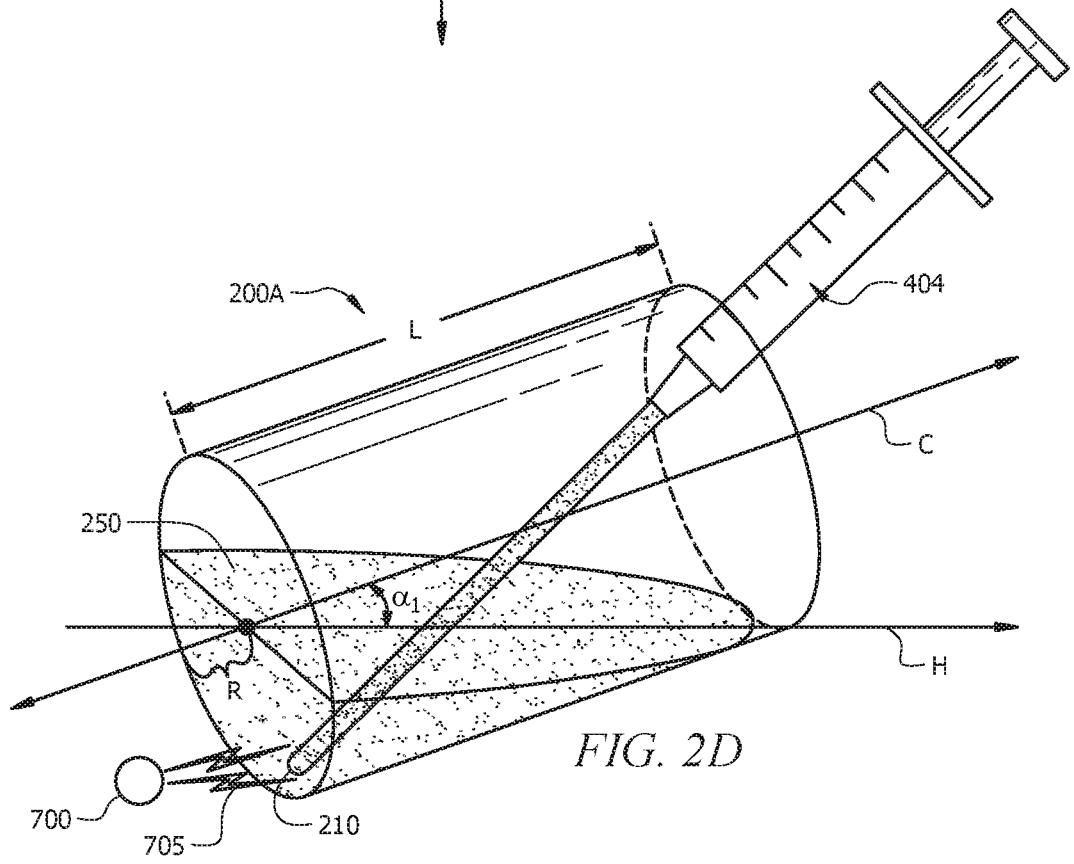
FIG. 2D is a schematic of an angled sample chamber configured for in situ or ex situ sag density determination.

FIG. 2D is a schematic of an angled sample chamber 200A, wherein the sample chamber 200A is angled to provide an angled sample chamber angle $\alpha_1$. In FIG. 2D, by way of example, angled sample chamber angle $\alpha_1$ is less than the angled sample chamber angle $\alpha_1$ of FIG. 2B/FIG.

2C. That is, the angled sample chamber 200A in FIG. 2D is flatter or more horizontal that the angled sample chamber 200A of FIG. 2B or 2C. As the angled sample chamber angle $\alpha_1$ is reduced, the angled sample chamber becomes more horizontal, and the fluid therein has a more uniform shape. This more uniform (e.g., semi-cylindrical) shape of the fluid allows for greater movement throughout the volume and generally assists in mixing, which factors combine to suspend weighted particles and prevent formation of strata with different density values (i.e., less sag). As depicted in FIG. 2D, determining the sag density of the fluid sample at the sample location 210 can include determining the sag density of the fluid sample at the sample location 210 in situ by passing a signal 705 through the angled sample chamber 200A utilizing a sensor 700. The sensor 700 may be disposed on or proximate to the angled sample chamber 200A (e.g., proximate end 201A and/or lowest point 208; the sensor may be positioned effective to direct a signal 705 toward/into the angled sample chamber 200A; the sensor 700 may be located within the angled sample chamber 200A; or a combination thereof. In such embodiments, determining of the sag density of the fluid sample at the sample location 210 can include determining the density of the fluid sample at the sample location 210 during and/or subsequent to the test period. Sensor 700 can provide signal 705. Sensor 700 can be, for example, an ultrasound, a magnetic resonance imaging (MRI), or an electrical conductivity sensor, and signal 705 can be an ultrasonic signal, a magnetic resonance imaging (MRI) signal, or an electrical conductivity signal.

For example, with continued reference to FIG. 2D, determining of the sag density of the fluid sample at the sample location 210 can include removing the fluid sample from the angled sample chamber 200A via a fluid sample extraction apparatus 404, and determining the density of the removed fluid sample ex situ. The fluid sample extraction apparatus 404 can be any suitable apparatus operable to extract a fluid sample from sample location 210. For example, fluid sample extraction apparatus 404 can include a pipette, a pycnometer, a syringe, a plunger assembly fluid sample extraction apparatus 404' of a pressurized density measuring device 400A, as described hereinbelow with reference to FIG. 5, or the like.

The sample fluid can be removed from the top (e.g., an upper strata, such as stratum S4 containing the upper ½ of the volume of the test volume of fluid in angled sample chamber 200A, stratum S5 containing the upper ⅓ of the volume of the test volume of fluid in angled sample chamber 200A, or stratum S6 containing the upper ¼ of the volume of the test volume of fluid in angled sample chamber 200A) of the volume of the test volume of fluid 250 in the angled sample chamber 200A. For example, the top 80-100 cm$^3$ of the volume of the test volume of fluid 250 in the angled sample chamber 200A can be extracted from angled sample chamber 200A and measured. This volume of fluid will show a decrease in density if sag occurred. Alternatively or additionally, for density measurements of fluid samples located below the center of gravity line, all of the fluid volume above the sample location 210 can be removed, leaving the sample location 210 or the stratum S1, S2, or S3 containing the sample location 210 (e.g., a bottom 80-100 cm$^3$ of the volume of the test volume of fluid 250 in angled sample chamber 200A). This remaining volume can be stirred to avoid localized accumulations of weighting material prior to sag density determination thereof. Measuring can be effected with a pycnometer device which can extract a small volume from a desired stratum location (e.g., S1, S2, or S3) within the test volume of fluid 250 in the angled sample chamber 200A. The small volume extracted by the pycnometer device can be, for example, about 2, 3, 4, or 5 cm$^3$, in one or more specific embodiments. The center of gravity line is a theoretical line that bisects the original volume for the homogeneous density fluid; as sag progresses, the center of gravity line lowers relative to the horizontal axis.

Figure 5:
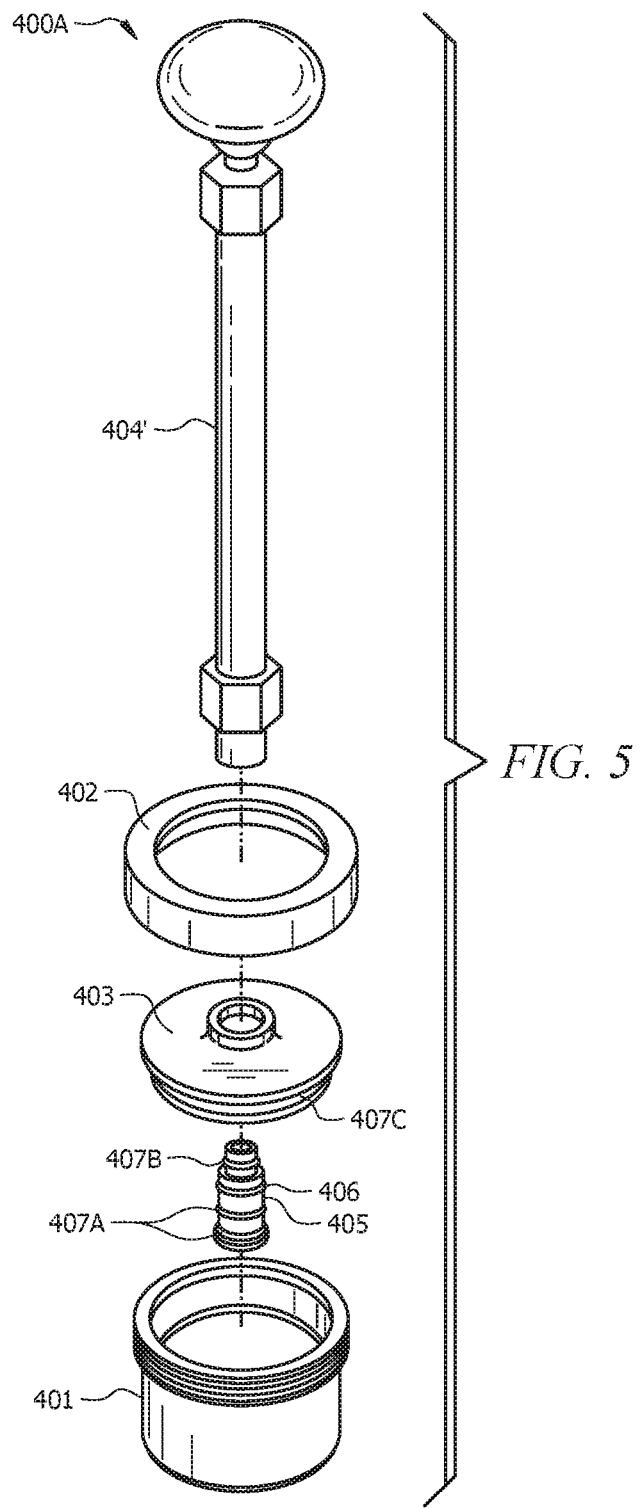
FIG. 5 is a schematic depicting components of a pressurized sag cup.

Determining the sag density 130 of the fluid sample at the sample location 210 can include determining the density of the fluid sample via a pressurized density measurement cell (e.g., a pressurized mud balance cell), such as, without limitation, a FANN® pressurized sag cup, available from FANN Instrument Company in Houston, Tex. As depicted in FIG. 5, which is a schematic depicting components of a pressurized sag cup, a pressurized sag cup can include a cup 401, a cup lid ring 402, a cup lid 403 and associated o-ring 407C, a plunger assembly 404', and a check valve 405 and associated O-rings 407A and 407B and external retaining ring 406. Operation of the pressurized density measurement cell to obtain the sag density can be effected as known to those of skill in the art. Basic steps include (1) stirring the volume of the stratum, (2) placing the fluid in a vacuum chamber to fully remove any trapped gas (e.g., from a pressurized test), then (3) transferring the fluid to the pressurized sag cup and measuring as directed by the equipment manual.

As indicated at block 135 of FIG. 1, a method of this disclosure can further include comparing the sag density of the fluid sample to an initial density of the test volume of the fluid 250 provided to the sample chamber 200/200A. The comparison may include determining a density change of the fluid from the initial density of the fluid at the sample location 210 provided in the angled sample chamber 200A (e.g., which can be the homogeneous density of the test volume of the fluid prior to or subsequent introduction into sample chamber 200 or angled sample chamber 200A) to the sag density of the fluid at the sample location 210 subsequent the test period. That is, the post-test (e.g., sag density) density of the fluid sample is compared to the pre-test (i.e., initial) density of the fluid sample.

Comparing the sag density of the fluid sample to the initial density of the test volume of the fluid 250 provided to the sample chamber 200 or angled sample chamber 200A can include subtracting the initial density of the test volume of fluid 250 from the sag density value of the fluid sample obtained after the test period to obtain a density change $\Delta D$.

The initial density of the test volume of fluid 250 and the sag density of the fluid sample can be measured, at the same temperature, using any suitable methods. For example, a pressurized density measurement cell, such as and without limitation, the FANN® pressurized sag cup, can be utilized to determine the initial density of the test volume of fluid 250 and the sag density of the fluid sample. In one or more specific embodiments, the initial density of the test volume of fluid 250 and the sag density which is the density of the fluid sample at the sample location are both determined at a same temperature, such as and without limitation, a temperature of 60, 70, or 80° F.

The density change $\Delta D$ can be utilized to evaluate the sag. For example and without wishing to be limited by theory, a density change $\Delta D$ in a first or low density change range (e.g., a range of from about 0.1 to about 0.5 lb/gal) may indicate minimal alteration to the fluid and a suitable formulation for avoiding sag problems in like conditions (e.g., in like ambient downhole conditions). A density change $\Delta D$ in a third or high density change range $\Delta D$ (e.g., greater than about 1.0 lb/gal) may be considered indicative of significant sag. A density change ΔD in a second or middle density change range ΔD (e.g., from about 0.5 to about 1.0 lb/gal) between the first density change range and the third density change range may be considered marginal. Other numbers of density change ranges and interpretations thereof can be utilized, depending on the fluid and the intended application therefor. As noted hereinabove, the sag density and/or the density change ΔD can be measured directly after the test period or via one or more real-time sensors 700 on the angled sample chamber 200A during the test period.

The sample location 210 can be a location in first stratum S1 containing a lower ½ of the volume of the test volume of fluid 250 in the angled sample chamber 200A, second stratum S2 containing a lower ⅓ of the volume of the test volume of fluid 250 in the angled sample chamber 200A, third stratum S3 containing a lower ¼ of the volume of the test volume of fluid 250 in the angled sample chamber 200A, fourth stratum S4 containing an upper ½ of the volume of the test volume of fluid 250 in the angled sample chamber 200A of the volume of the test volume of fluid 250 in the angled sample chamber 200A, fifth stratum S5 containing an upper ⅓ of the volume of the test volume of fluid 250 in the angled sample chamber 200A, or sixth stratum S6 containing an upper ¼ of the volume of the test volume of fluid 250 in the angled sample chamber 200A.

Without limitation, the fluid sample can include from about 10 to about 150, from about 20 to about 125, or from about 50 to about 100 cm$^3$ of the fluid in the stratum S containing the sample location 210 (e.g., first stratum S1, second stratum S2, third stratum S3, fourth stratum S4, fifth stratum S5, or sixth stratum S6). For example, in one or more specific embodiments, the fluid sample can include from about 10 to about 150, from about 20 to about 125, or from about 50 to about 100 cm$^3$ of the fluid in the first stratum S1 containing the lower ½ of the test volume of the fluid 250 in the angled sample chamber 200A. In one or more specific embodiments, the sample location 210 is in a stratum S containing or providing a trap or is in a trap located within a lowest region 205 of the angled sample chamber 200A. For example, given an angled sample chamber 200A with an angled sample chamber angle α$_1$ (e.g., of 45 degrees), the curved round edge 601 of the bottom surface of the angled sample chamber 200A can be where weighting material, such as barite, can accumulate and be 'trapped'. Once located there, the fluid motion is not sufficient to re-suspend the accumulated weighting material. Most of the motion is present toward the surface of the fluid (e.g., the top 252 of the test volume of fluid 250) in the angled sample chamber 200A and the middle portion during rotating at 120. Alternate traps 600 can be employed. For example and without limitation, a cylindrical sample chamber 200 can have a concave first end (e.g., "bottom") 201A for promoting collection of weighting material.

A method of this disclosure can further include determining a settling velocity of the fluid utilizing the sag density. For example, the test results (e.g., sag densities, density change ΔD) obtained as detailed hereinabove can be translated into settling velocity rates for a given fluid. Results in terms of the sag density and/or the density change ΔD can be utilized to derive the settling velocity by using physical constants, such as the fluid density, solids, water, and oil components. By using these settling rates and well bore physics models, fluid performance can be predicted, for example, via digital models to advance planning, monitoring and operational diagnostics. For example, sag density evaluation as detailed herein can be utilized in place of data obtained via the more complicated Dynamic High Angle Sag Tester (DHAST) to predict sagged fluid composition and mud weight as described in U.S. Pat. No. 9,187,966. In applications, the herein disclosed sag evaluation system and method can be utilized to measure and calculate the settling velocity for barite in various non-aqueous fluid (NAF) formulations (e.g., non-aqueous wellbore servicing fluids such as oil based drilling fluid/mud formulations). These values can then be utilized in wellbore simulations to predict and diagnose density variations, hydraulics and/or sag events.

Although depicted and numbered in a certain order in FIG. 1, a method of this disclosure can include a different number and/or arrangement of the steps depicted in FIG. 1. One or more steps depicted in FIG. 1 can be absent, two or more steps depicted in FIG. 1 can be combined, and/or the steps can be rearranged. For example and without limitation, determining the initial density of the test volume of fluid 250 at 105, providing an object within angled sample chamber 200A, and/or comparing the sag density of the fluid sample with the initial density of the test volume of fluid 250 can be absent, in one or more specific embodiments of method 100. Alternatively, the test volume of fluid 250 provided into angled sample chamber 200A at 110 can contain the object 400, such that steps 110 and 115 are integrated into a single step. In one or more specific embodiments, determining the initial density of the test volume of fluid 250 can be effected subsequent or during the providing the test volume of fluid into the angled sample chamber 200A at 110, subsequent or during the rotating of the angled sample chamber 200A about the central axis C thereof for the test period at 120, and/or subsequent or during the determining of the sag density of the fluid sample at 130. For example, when the test volume of fluid is homogeneous when provided into the angled sample chamber 200A at 110, another volume of that fluid can be utilized to determine the initial density of the test volume of fluid 250 subsequent placing the test volume of the fluid 250 into the sample chamber 200 or into the angled sample chamber 200A.

Also disclosed herein is a method of designing a fluid for sag performance downhole at an operating temperature and an operating pressure. The method includes: providing the fluid, wherein the fluid includes a weighting agent (e.g., a wellbore servicing fluid such as an oil based drilling fluid comprising a weighting agent); determining one or more properties of the fluid, when homogeneous, wherein the one or more properties include an initial density and viscosity of the fluid at a test temperature and a test pressure; predicting a settling velocity of the fluid at the operating temperature and the operating pressure utilizing the initial density, the viscosity, and a sag density, wherein the sag density is determined via the dynamic sag performance evaluation method described hereinabove with reference to FIG. 1, and adjusting a composition of the fluid if the predicted settling velocity is above a threshold settling velocity. The operating temperature may or may not be equal to the test temperature and the operating pressure may or may not be equal to the test pressure. The threshold settling velocity can be determined based on a case by case basis. In one or more specific embodiments, the threshold settling velocity is a settling velocity of less than or equal to about 0.01, 0.02, 0.03, 0.04, 0.05, 0.06, 0.07, 0.08, 0.09, 0.1, or 0.15 mm/h. If the predicted settling velocity is above the threshold settling velocity, the composition of the fluid can be adjusted as known to those of skill in the art. For example, adjusting the composition of the fluid can include adjusting a particle size and/or concentration of the weighting agent in the fluid, adjusting a viscosity of the fluid, or combinations thereof.

Also disclosed herein is a system for dynamic sag evaluation. The system for dynamic sag evaluation according to this disclosure includes: a roller oven 300 (e.g., as described hereinabove with reference to FIG. 3) containing an angled sample chamber 200A (e.g., as described hereinabove with reference to FIG. 2B, FIG. 2C, and FIG. 2D), wherein the angled sample chamber 200A has a central axis C, wherein the central axis C of the angled sample chamber 200A is angled relative to horizontal H; and wherein the roller oven 300 is configured for rotating (e.g., rolling) the angled sample chamber 200A about the central axis C for a test period and at a test temperature; and a density measuring device 400 (e.g., a pressurized density measuring device as described hereinabove, such as a pressurized sag cup 400A described hereinabove with reference to FIG. 5) configured to determine the sag density, wherein the sag density is defined as a density of a fluid sample at a sample location 210 of a stratum S in the angled sample chamber 200A. As noted hereinabove, the central axis C of the angled sample chamber 200A can be angled from horizontal H at an angle $\alpha_1$ in a range of from about 1 to about 85 degrees; from about 10 to about 85 degrees; from about 15 to about 75 degrees; from about 15 to about 70 degrees; and/or greater than or equal to about 1, 2, 3, 4, 5, 6, 7, 8, 9, 10, 11, 12, 13, 14, 15, 20, 25, 30, 35, 40, 45, 50, 55, 60, 65, 70, 75, 80, or more degrees. As detailed hereinabove, the density measuring device 400 can be configured to determine the sag density in situ, without removing the fluid sample from the angled sample chamber 200A, or ex situ, subsequent removing the fluid sample from the angled sample chamber 200A.

Those of ordinary skill in the art will readily appreciate various benefits that may be realized by the present disclosure. Such benefits can include, for example and without limitation, ease of testing, enhanced accuracy, a more stringent test and/or faster results. This disclosure provides reliable testing equipment to evaluate the sag tendency of fluids, such as drilling fluids.

Via the sag evaluation system and method of this disclosure, a rotation speed can be varied to lower rates which approximate to low shear rates encountered in a well. The rotation can optionally be changed from one direction (constant) to variable and/or oscillating rates. An angled sample chamber 200A having a sample chamber angle $\alpha_1$ between the central axis C thereof and horizontal H is utilized to induce Boycott settling effects and help trap heavier settled particles. The angled sample chamber angle $\alpha_1$ can be provided, for example, by a roller oven 300 angled to a roller oven angle $\alpha_1'$ between a sample chamber surface within roller over 300 and/or a bottom 305 thereof and horizontal H, which can be equal to or not equal to sample chamber angle $\alpha_1$.

The test results obtained via the sag evaluation system and method can be translated into settling velocity rates for a given fluid. By using these rates and well bore physics models, fluid performance can be predicted, for example, via digital models to advance planning, monitoring and operational diagnostics. Applications of the methods to real-world fluids in challenging wellbore environments can be utilized to calibrate results and experimental methods. By aligning the thresholds of lab-generated and field obtained operational (e.g., barite) sag results, a correlation can be made to provide reliable indicators to the potential for sag and weight variation in active drilling operations.

The presently disclosed methods and systems may be used with contemporary drilling programs that require the use of low-viscosity fluids, which generate minimal frictional pressures or equivalent circulating densities (ECDs). Since lower viscosity fluids are more prone to sag than thicker versions, a careful balance must be struck between low ECD and sag avoidance, and the presently disclosed methods and systems are beneficial tools to aid in establishing this careful balance. The sag evaluation system and method of this disclosure provide an indicator of weighted material (e.g., barite) sag, which can enable enhanced optimization of low-ECD fluid designs such as, for example and without limitation, BARAECD® NAF fluid system available from Halliburton Energy Services in Houston, Tex. The method provided herein is a functional dynamic sag method that can be operated at downhole temperatures, thus allowing engineering of enhanced solutions and further development of low ECD fluid technology. The results of the dynamic sag evaluation system and method can be correlated to actual field performance to increase technical assurance of fluids meeting parameters for proper functioning downhole.

The herein disclosed sag evaluation system and method can provide a direct density measurement within relatively short test period (e.g., 1-2 days). Using a roller sag evaluation method as detailed herein is much simpler than utilizing the more complicated conventional DHAST, flow loop (which typically require large fluid volumes and are run at atmospheric conditions), and VSST devices, and the sag evaluation system and method described herein do not require specialized lab personnel or additional test inputs, such as a compositional description of the fluid being analyzed (e.g., the test volume of fluid). A direct reading of weight variation in the angled sample chamber 200A provided by the disclosed sag evaluation system and method can also eliminate interferences from derived readings.

In one or more specific embodiments, the system and method of this disclosure enable for a dynamic sag evaluation that can utilize a standard lab barrel of fluid and subject it to well conditions conducive to sag.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

COMPARATIVE EXAMPLE 1: Sag was evaluated for a variety of NAF fluids using VSST and extended time (168 hour) static aging (SA) tests. The NAF fluids contained differently sized barite weighting agent, including 325-mesh barite (e.g., Barite 325), ultra fine grind (UFG) barite, and micronized barite. Barite 325 has a d50 particle size of about 14 μm, UFG has a d50 particle size in the range of about 5-6 μm, and micronized barite has a d50 particle size of about 2 μm, with a maximum of about 5-6 μm.

Figure 6:
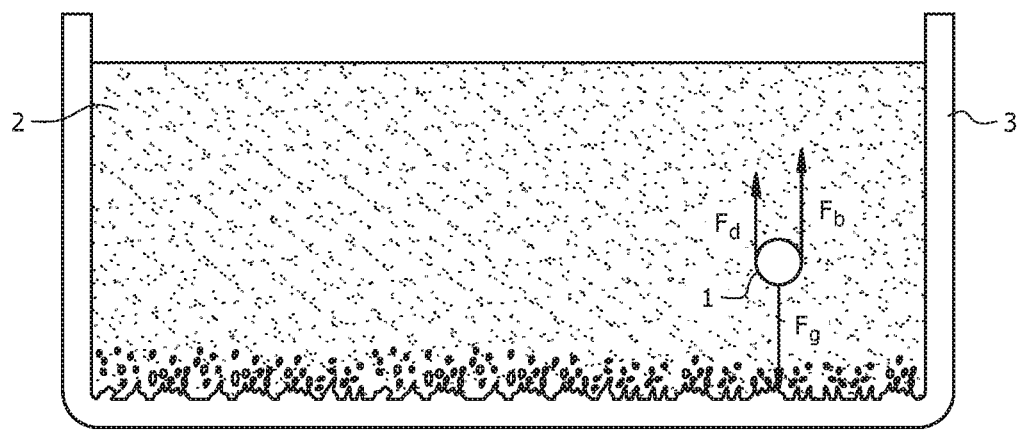
FIG. 6 is a schematic of a weighted particle settling in a fluid in a settling tank or vessel.

As depicted in FIG. 6, which is a schematic of a weighted particle 1 (e.g., a barite particle) settling in a fluid 2 in a settling tank or vessel 3, the three forces acting on the solid particle in any settling tank/space are: $F_d$, $F_b$, and $F_g$, wherein $F_b$ is the buoyancy force or the effect of displacing the fluid; $F_d$ is the drag force or the effect of viscous drag of the fluid on the sphere; and $F_g$ is the gravitational attraction force. By summing forces in the vertical direction we can write the following equation:

$$F_d + F_b = F_g.$$

Figure 7:
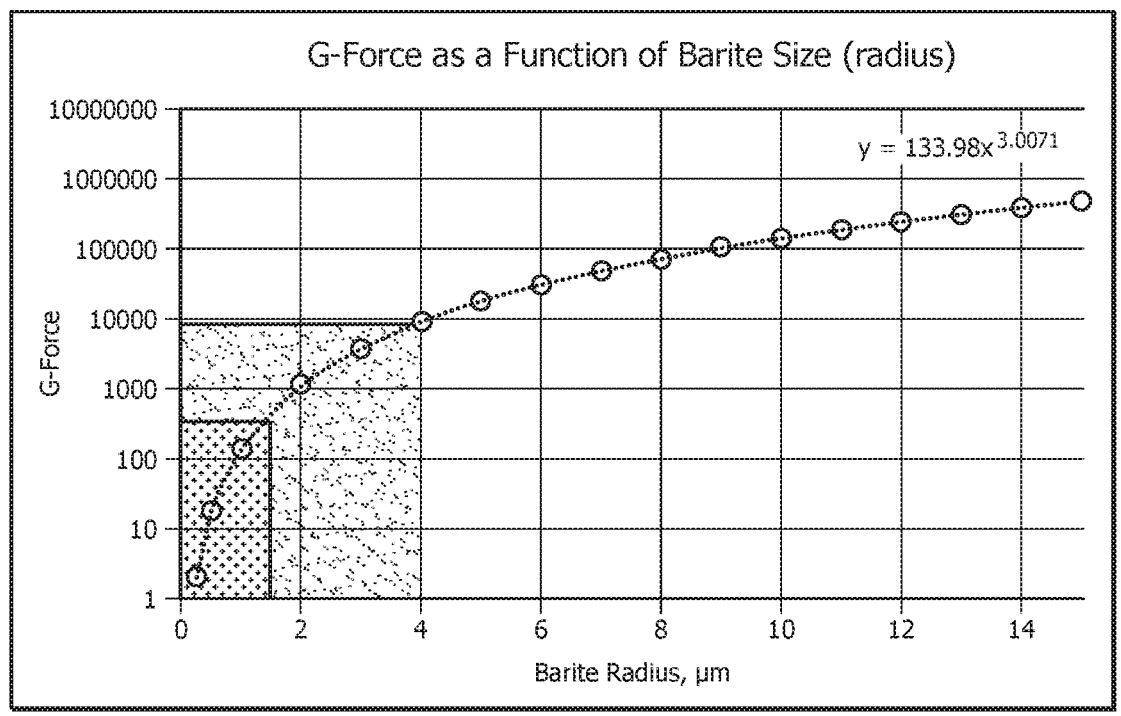
FIG. 7 is a schematic illustrating the gravitational force as a function of weighted particle size.

As seen in FIG. 7, which is a schematic illustrating the gravitational force as a function of weighted particle size, the gravitational attraction force $F_g$ is substantially different among the three barites studied, with the gravitational attraction force on UFG being about 16 times stronger than that on micronized barite, and the pull on 325-mesh barite being about 343 times stronger than that on micronized barite.

Figure 8:
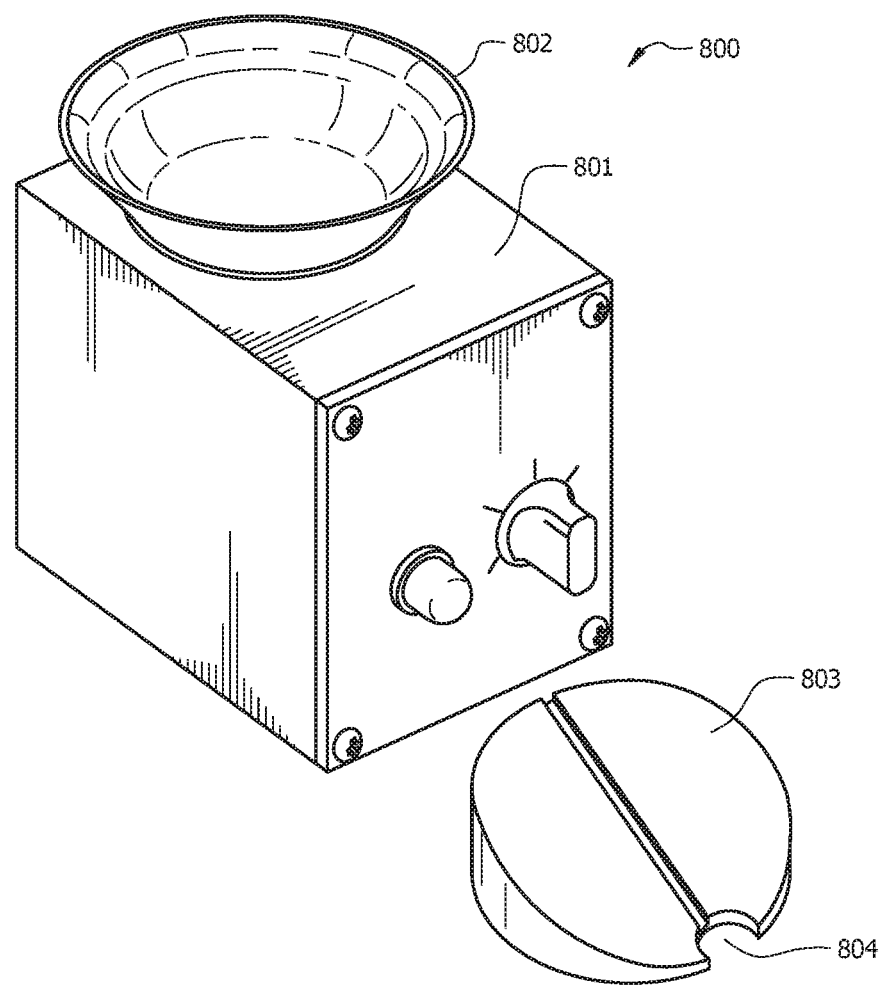
FIG. 8 is a schematic of components of a sag shoe apparatus including a viscometer, a thermocup, and a sag shoe providing a collection well.

The Viscometer Sag Shoe Test or VSST adopted by the API several years ago provides only a glimpse of how well a fluid is suited to the complex dual tasks of low ECD and sag avoidance described hereinabove. As described in API Recommended Practice B-2, 5th Edition, VSST utilizes a fluid sample at 120° F. at atmospheric pressure and at a single shear rate of 100 rpm, which is held for 30 minutes. FIG. 8, is a schematic of such a sag shoe apparatus 800 including a thermocup 801, a sample chamber 802, and a sag shoe 803 providing collection well 804. The viscometer sag shoe test (VSST) experiments of this Comparative Example 1 were carried out according to API Recommended Practice B-2, 5th Edition, utilizing an OFITE® viscometer including such a sample chamber 802 and sag shoe 803 defining a collection well 804.

The Viscometer Sag Shoe Test (VSST) is a well site and laboratory test that measures the weight material sag tendency of field and lab-prepared drilling fluids under dynamic conditions. The VSST provides an intrinsic fluid property without regard to the conditions under which the fluid has been or will be used. As such, results must be combined with operational factors to correlate results with sag experienced in the field. The VSST designation is derived from a rotational viscometer used as a mixer and the thermoplastic insert (sag shoe 803) designed to concentrate sagged weight material in the bottom of a sample chamber 802 in thermocup 801. Sag tendency is determined by the density increase of samples extracted from the collection well 804 after a 30-minute period at a standard temperature and under a consistent rate of shear.

Figure 9B:
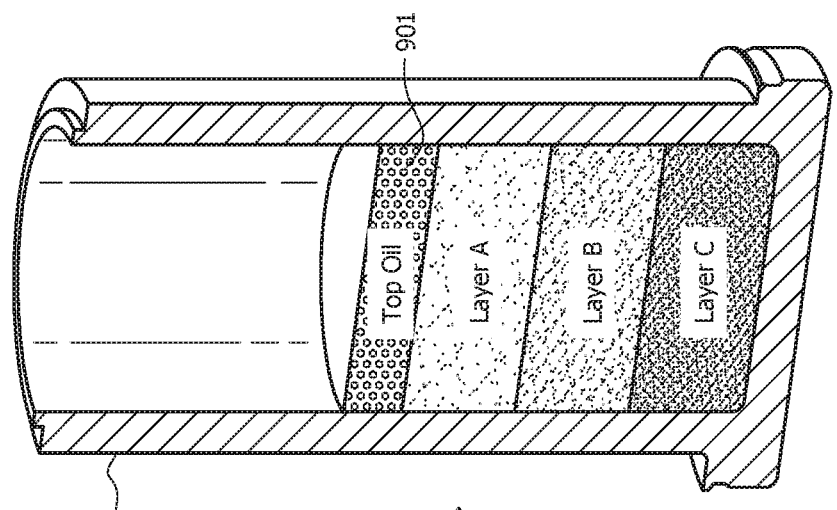
FIG. 9B is a schematic of the aging cell or vessel of FIG. 9A containing the volume of fluid subsequent the aging period.
Figure 9A:
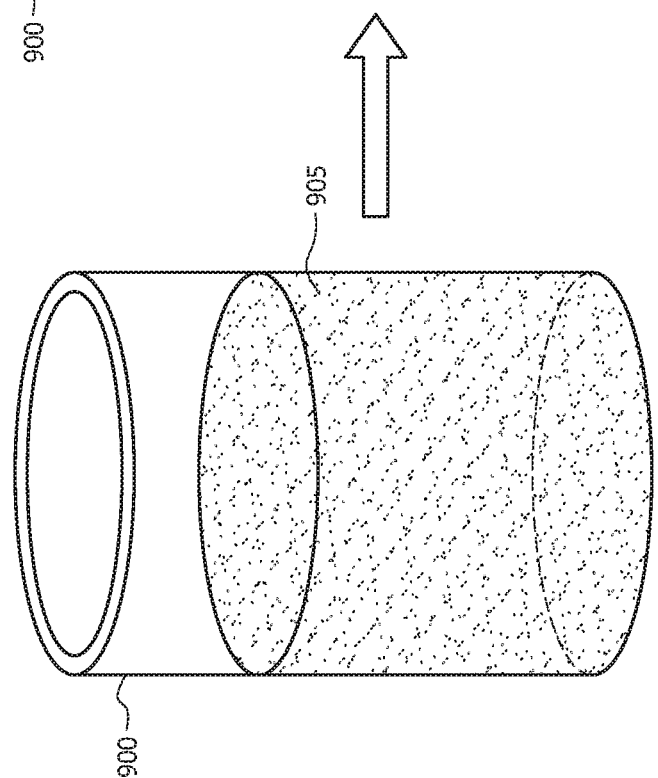
FIG. 9A is a schematic of an aging cell or vessel containing a volume of fluid at the start of a static aging test.

The static aging tests of this Comparative Example 1 were carried out according to Section 22 of API Recommended Practice 131, 8$^{th}$ Edition, March 2009. For the static aging tests, a test sample of fluid having a uniform density is introduced into an aging cell or vessel and let sit for a time period under zero shear, after which the fluid is analyzed. FIG. 9A is a schematic of an aging cell or vessel 900 at the start of a static aging test, containing a uniform density fluid; FIG. 9B is a schematic of the aging cell or vessel 900 of FIG. 9A subsequent the aging period, after which the fluid can be separated into a top oil or layer 901, a Layer A below the top oil or layer 901, a Layer B below the Layer A, and a Layer C at the bottom of the aging cell or vessel 900 below Layer B. The top oil or layer 901 has a lower density than the uniform density of the uniform density fluid introduced into aging vessel 900 in FIG. 9A and has a lower density than the lowest layer or "Layer C" (e.g., a lowest 100 cm$^3$) of the fluid that has an increased density relative to the uniform density fluid introduced into the aging vessel 900 in FIG. 9A. Static aging tests provide for full gel formation, at zero shear, with minimal change in density of the fluid (e.g., relative to dynamic aging tests, such as VSST and the sag evaluation method described herein). Density was measured utilizing a FANN® Pressurized Sag Cup, available from FANN® Instrument Company in Houston, Tex. The density measuring device 400 utilized in this Comparative Example 1 was a FANN® Pressurized Sag Cup, available from FANN® Instrument Company in Houston, Tex. Such a pressurized sag cup apparatus 400A, including a cup 401, a cup ring lid 402, a cup lid 403, and a plunger assembly 404', is described hereinabove with reference to FIG. 5.

Figure 10:
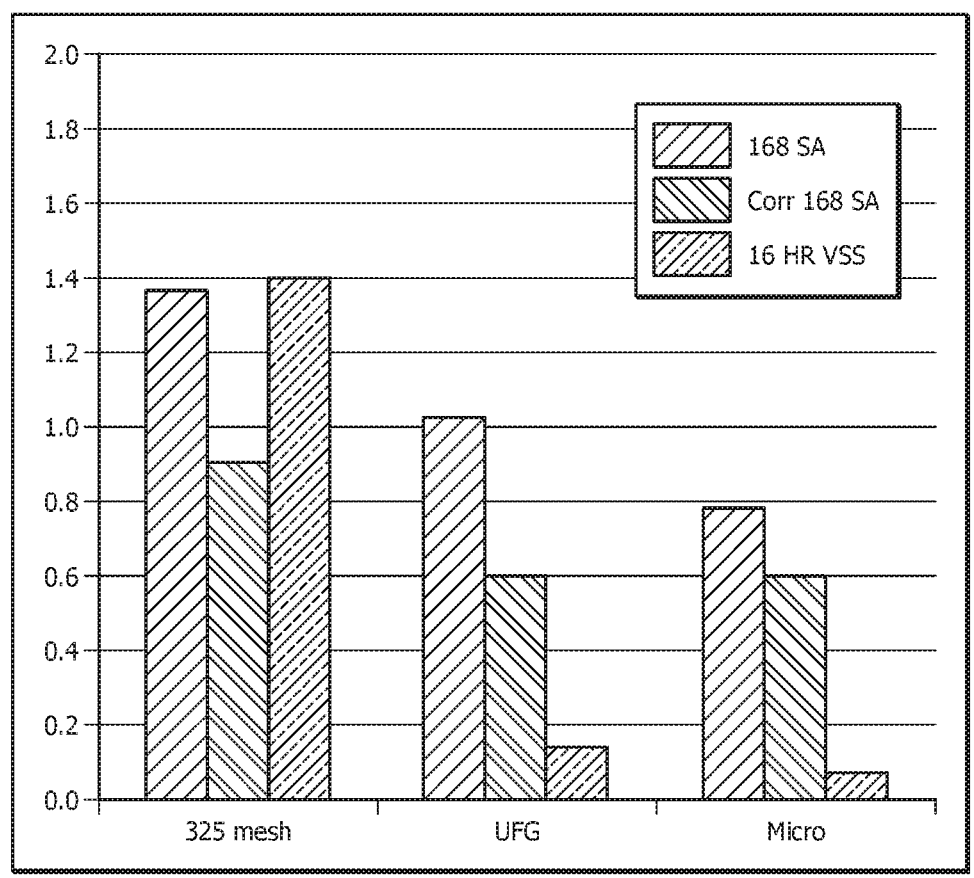
FIG. 10 is a bar graph of the test results of Comparative Example 1, showing the density change in pounds per gallon.

FIG. 10 is a bar graph of the test results of this Comparative Example 1, showing the density change in pounds per gallon. In FIG. 10, the VSS test results are labeled "16 HR VSS" and the static aging test results are labeled "168 SA". The static aging experiments of this Comparative Example 1 were performed at 210° F. As seen in FIG. 10, VSST results showed high sag for NAF containing larger barite particles and nearly zero sag for the smaller barite sizes.

For the static aging tests, the bottom 100 cm$^3$ of fluid (i.e., in Layer C) was isolated and measured by means of the pressurized cup described with reference to FIG. 5. When the density increases for this volume, it can also be attributed to the amount of light top oil 901 which has separated on top of the fluid column. By extracting the volume and mass components of this light top oil volume, the corrected readings (labeled "Corr 168 SA" in FIG. 10) were calculated. No difference is seen in the density change between UFG and micronized barite samples once the readings were corrected.

The results of this Comparative Example 1 indicate that the VSST and static aging tests have limited utility for predicting NAF performance in field applications.

COMPARATIVE EXAMPLE 2: Three large batches of NAF were mixed and sheared at a commercial facility and evaluated utilizing static sag tests and conventional (e.g., horizontal) hot rolling (HR) tests. The fluids were numbered A, B and C, and were identical in composition except they contained differently sized barite. Fluid A contained NAF having an oil to water ratio (e.g., volume percent of oil to water, or OWR) of 90:10 and UFG Barite; Fluid B contained NAF having the same oil to water ratio (e.g., volume percent of oil to water, or OWR) of 90:10 and Barite 325; and Fluid C contained NAF having the same oil to water ratio (e.g., volume percent of oil to water, or OWR) of 90:10 and Micronized barite. Each of the fluids (e.g., Fluid A, Fluid B, and Fluid C of this Comparative Example 2 had an initial density of about 14.2 pounds per gallon (ppg). Table 1 depicts the fluid properties for Fluid A, Fluid B, and Fluid C. The rheology profiles were substantially identical for all three fluids, such that each of the three samples should provide similar particle suspension, and the sag behavior thereof depends on the high-density particle sizes. Static aging (SA) tests were performed as described in Comparative Example 1. Hot rolling (HR) included placing the fluid in a sample chamber, such as sample chamber 200 of FIG. 2A, and rotating about horizontal H axis (e.g., not rotating at a sample chamber angle $\alpha_1$ from horizontal H) for a short amount of time (e.g., 16 hours) at a uniform shear (e.g., rotation at 30 rpm). Conventional (e.g., non-angled) hot rolling (HR) provides for limited gel formation.

TABLE 1

Results from Comparative Example 2

| | Fluid A (UFG barite, OWR 90/10) Post-shear | | | | | Fluid B (Barite 325, OWR 90/10) Post-shear | | | | | Fluid C (Micronized barite, OWR 90/10) Post-shear | | | | |
|---|---|---|---|---|---|---|---|---|---|---|---|---|---|---|---|
| Rolled-hours 210° F. | HR-16 h | | | — | | HR-16 h | | | — | | HR-16 r | | | — | |
| Static Age-hours, 210° F. | — | | | SA-168 h | | — | | | SA-168 h | | — | | | SA-168 h | |
| Rheology Temp, F | 40 F. | 120 F. | 150 F. | 120 F. | 150 F. | 40 F. | 120 F. | 150 F. | 120 F. | 150 F. | 40 F. | 120 F. | 150 F. | 120 F. | 150 F. |
| 600 rpm | 170 | 58 | 52 | 60 | 50 | 209 | 60 | 52 | 63 | 52 | 158 | 60 | 53 | 66 | 59 |
| 300 rpm | 89 | 33 | 31 | 34 | 30 | 116 | 34 | 30 | 35 | 30 | 85 | 35 | 32 | 38 | 35 |
| 200 rpm | 64 | 25 | 23 | 25 | 22 | 83 | 24 | 22 | 25 | 22 | 61 | 26 | 25 | 29 | 27 |
| 100 rpm | 36 | 15 | 15 | 15 | 13 | 49 | 14 | 13 | 15 | 13 | 35 | 17 | 15 | 18 | 17 |
| 6 rpm | 7 | 5 | 6 | 4 | 5 | 11 | 4 | 5 | 4 | 5 | 8 | 5 | 6 | 6 | 8 |
| 3 rpm | 6 | 5 | 6 | 4 | 5 | 9 | 4 | 5 | 4 | 5 | 7 | 5 | 6 | 6 | 9 |
| Plastic viscosity, cP | 81 | 25 | 21 | 26 | 20 | 93 | 26 | 22 | 28 | 22 | 73 | 25 | 21 | 28 | 24 |
| Yield point, lb/100 ft$^2$ | 8 | 8 | 10 | 8 | 10 | 23 | 8 | 8 | 7 | 8 | 12 | 10 | 11 | 10 | 11 |
| 10 Sec gel, lb/100 ft$^2$ | 9 | 10 | 11 | 8 | 9 | 12 | 8 | 9 | 8 | 10 | 10 | 10 | 11 | 12 | 15 |
| 10 Min gel, lb/100 ft$^2$ | 38 | 29 | 34 | 28 | 30 | 38 | 32 | 34 | 32 | 33 | 35 | 31 | 34 | 48 | 56 |
| 30 Min gel, lb/100 ft$^2$ | 51 | 39 | 42 | 37 | 38 | 52 | 42 | 41 | 43 | 38 | 49 | 40 | 47 | 60 | 74 |
| Top Oil, mL | | | | 24 | | | | | 36 | | | | | 15 | |
| Top Mud Density, lb/gal | | | | 14.07 | | | | | 14.03 | | | | | 13.96 | |
| Bottom Mud Density, lb/gal | | | | 15.40 | | | | | 16.20 | | | | | 14.99 | |
| Sample Density | | | 14.18 | | | | | 14.20 | | | | | 14.19 | | |
| Density change, lb/gal | | | | 1.22 | | | | | 2.00 | | | | | 0.80 | |
| Sag Factor | | | | 0.523 | | | | | 0.536 | | | | | 0.518 | |

Although there were significant differences in the barite sizes used, the results in Table 1 show that the bottom density after aging for one week at 210° F. can increase from 0.8 to 2.0 ppg. The sag factors, which were calculated as the bottom density divided by the bottom density plus the top density, only varied from 0.518 to 0.536.

EXAMPLE 1: Angled sampling tests were performed as disclosed hereinabove. As noted herein, the use of an angled sample chamber 200A provides an angled pool that can present a 'trap' 600 for a sagged portion of the test volume of the fluid, promotes the Boycott settling effect, and enables utilization of variable shear rates. Various Non-Aqueous Fluid (NAF) formulations were mixed in the laboratory and utilized for the test volumes of fluid 250. Rheological properties were varied among the samples. Each fluid was hot rolled (HR) at 210° F. for conditioning before testing. The angled sample chambers 200A were at an angled sample chamber angle $\alpha_1$ of 45° and were loaded in each instance with 350 cm3 of NAF by mass calculation. Angling of the angled sample chambers 200A was provided by a roller oven 300 angled at roller oven angle $\alpha_1'$ (here=$\alpha_1$) of 45°. Rotating of the angled sample chambers 200A was effected as noted in Table 2. After the test, the angled sample chambers 200A were cooled and the bottom 108 cm$^3$ of fluid was isolated and stirred, and placed in a vacuum chamber before measuring the density to remove any entrained air. Results of twenty tests are summarized in Table 2 below, with all tests conducted at an oven temperature of 215° F.

TABLE 2

Results of Example 1

| Test Fluid # | Rotation Speed, rpm | Time Elapsed, h | Object included? | Initial Density, ppg | Bottom Density, ppg |
|---|---|---|---|---|---|
| 1 | 3 | 1.33 | None | 13.97 | 13.97 |
| 1 | 3 | 1.33 | Barstock | 13.97 | 14.09 |
| 1 | 8 | 3 | None | 13.97 | 14.12 |
| 1 | 8 | 6 | None | 13.97 | 14.26 |
| 1 | 8 | 3 | Marble | 13.97 | 14.44 |
| 1 | 8 | 6 | Marble | 13.97 | 14.59 |
| 1 | 8 | 6 | Barstock | 13.97 | 14.22 |

TABLE 2-continued

Results of Example 1

| Test Fluid # | Rotation Speed, rpm | Time Elapsed, h | Object included? | Initial Density, ppg | Bottom Density, ppg |
|---|---|---|---|---|---|
| 1 | 16 | 6 | Marble | 14.03 | 14.15 |
| 1 | 16 | 6 | None | 14.03 | 14.37 |
| 1 | 18 | 8 | Marble | 14.03 | 14.72 |
| 1 | 18 | 8 | None | 14.03 | 14.69 |
| 2 | 8 | 6 | None | 11.33 | 11.41 |
| 2 | 16 | 16 | None | 11.13 | 11.67 |
| 2 | 16 | 16 | None | 11.03 | 11.59 |
| 3 | 8 | 6 | None | 11.45 | 11.49 |
| 3 | 16 | 16 | None | 11.45 | 11.65 |
| 1 | 16 | 16 | None | 14.07 | 15.35 |
| 1 | 16 | 16 | None | 14.07 | 15.39 |
| 1 | 30 | 16 | None | 14.07 | 15.30 |
| 4 | 16 | 19 | None | 14.15 | 14.64 |

Compared with the typical hot rolling test, which uses a standard rotation speed of 30-45 rpm and a horizontal cell, the results of this Example 1 confirm that sag can be simulated in angled cells at lower rotating speeds. The maximum amount of sag observed in the least amount of time was the test for 6 hours at 8 rpm with the marble included.

EXAMPLE 2: For testing in a dynamic mode, samples of Fluid A, Fluid B, and Fluid C of Comparative Example 2 were first hot rolled at 210° F. for temperature conditioning. They were then placed in the angled roller oven 300 of Example 1 at 215° F. The samples were rolled for a test period of 16 hours at 16 rpm, after which time, the bottom density was measured. In the static tests of Comparative Example 2, 15-36 cm³ of top oil 901 separation was observed, making up 4-10% of the sample volume. This separation of top oil 901 affects the bottom density, in that reduced oil volume increases the resulting bottom density readings. Table 3 provides the test results of this Example 2. The NAF samples tested in this Example 2 in the angled roller oven 300 according to this disclosure at these conditions showed no signs of oil separation.

TABLE 3

| NAF Sample | Barite size, d-50 | Initial Density, ppg | Bottom Density, ppg | Settling velocity, mm/h |
|---|---|---|---|---|
| Fluid B | 13 | 14.16 | 16.02 | 0.18 |
| Fluid A | 7 | 14.19 | 15.15 | 0.09 |
| Fluid C | 2 | 14.15 | 14.29 | 0.01 |
| Fluid C (2$^{nd}$ Test) | 2 | 14.15 | 14.34 | 0.02 |
| Fluid A (2$^{nd}$ Test) | 7 | 14.19 | 15.21 | 0.10 |

As seen in the results in Table 3, when all the other variables have been levelled, the difference between the barite sizes became very apparent utilizing the dynamic sag disclosure evaluation method of this disclosure. Accordingly, the method provided herein presents a novel way to quickly assess barite sag performance in NAF. Without being bound by theory, empirical evidence suggests that settling velocities of less than 0.15 may allow for a high degree of sag resistance in challenging well designs.

EXAMPLE 3: In this Example 3, fluid samples containing the three barites (e.g., UFG barite, 325-mesh barite, and micronized barite) were studied utilizing static aging, VSST, and the angled sample chamber 200A dynamic sag evaluation method 100 of this disclosure. The results are provided in Table 4. As seen in the results in Table 4, the VSST results show no significant difference between the UFG barite samples and the micronized barite samples, and the corrected density results show no significant difference among the disparate samples containing the three barite sources. However, the dynamic sag evaluation method of this disclosure provides sag densities that increase going from the micronized barite to the UFG barite to the 325-mesh barite.

*TABLE 4

| | Fluid Sample Containing Barite 325 | Fluid Sample Containing UFG Barite | Fluid Sample Containing Microbarite |
|---|---|---|---|
| Density, lb/gal | 14.05 | 14.02 | 14.09 |
| 600 rpm (150° F.) | 57 | 54 | 58 |
| 300 rpm | 33 | 32 | 36 |
| 200 rpm | 25 | 24 | 28 |
| 100 rpm | 16 | 16 | 18 |
| 6 rpm | 5 | 6 | 7 |
| 3 rpm | 5 | 6 | 7 |
| 10-sec gel | 10 | 11 | 12 |
| 10-min gel | 35 | 39 | 33 |
| One Week (168) Static Aging (SA) Results, 210° F. | | | |
| Top oil, cm³ | 22.0 | 18.0 | 9.4 |
| Layer C density, lb/gal | 15.42 | 15.04 | 14.87 |
| Layer C increase, lb/gal | 1.37 | 1.02 | 0.78 |
| *VSST (120° F.) | 15.43 | 14.16 | 14.16 |
| *VSST (120° F.) Change | +1.38 | +0.14 | +0.07 |
| 'Corrected Density, lb/gal | 14.92 | 14.64 | 14.66 |
| Sag Density Obtained Via Herein Disclosed Sag Evaluation Method | 15.95 | 15.02 | 14.29 |

*Rheology and VSST are after HR for 16 hat 210° F.
'Corrected density is the initial mass minus the mass of the top oil removed, divided by the new volume.

Additional Disclosure

The following are non-limiting, specific embodiments in accordance with the present disclosure:

In a first embodiment, a method for dynamic sag evaluation of a fluid comprises: providing a test volume of the fluid into an angled sample chamber, wherein the angled sample chamber has a central axis, and wherein the central axis of the angled sample chamber is angled relative to horizontal; rotating (e.g., rolling) the sample chamber about the central axis for a test period; and determining a sag density, wherein the sag density is a density of a fluid sample taken at a sample location within a stratum of the test volume of the fluid present in the angled sample chamber.

A second embodiment includes the method of the first embodiment, wherein the central axis is angled from horizontal at an angle in a range of from about 10 to about 85 degrees, from about 15 to about 75 degrees, from about 15 to about 70 degrees, and/or greater than or equal to about 1, 2, 3, 4, 5, 6, 7, 8, 9, 10, 15, 20, 30, 40, 50, 60, 70, or 80 degrees.

A third embodiment includes the method of the first embodiment or the second embodiment further comprising comparing the sag density to an initial density of the test volume of the fluid provided to the sample chamber by determining a density change of the fluid from the initial density of the fluid at the sample location provided in the angled sample chamber to the sag density of the fluid at the sample location subsequent the test period.

A fourth embodiment includes the method of the third embodiment, wherein the test volume of fluid is substantially homogeneous when provided into the angled sample chamber.

A fifth embodiment includes the method of the third embodiment or the fourth embodiment further comprising determining the initial density prior to providing the test volume of fluid into the angled sample chamber.

A sixth embodiment includes the method of any one of the first to the fifth embodiments further comprising maintaining the test volume of fluid in the angled sample chamber at a test temperature during all or a portion of the test period.

A seventh embodiment includes the method of any of one of the first to the sixth embodiments, wherein the fluid comprises a weighted wellbore fluid comprising a weighting agent.

An eighth embodiment includes the method of the seventh embodiment, wherein the test temperature comprises a temperature of a wellbore in which the weighted wellbore fluid will be or is being utilized downhole.

A ninth embodiment includes the method of any one of the sixth to the eighth embodiments, wherein the test temperature is a temperature in a range of from about 25° C. to about 300° C., from about 20° C. to about 200° C., from about 25° C. to about 200° C., from about 25° C. to about 150° C., greater than or equal to about 25° C., 50° C., or 75° C., and/or less than or equal to about 300° C., 200° C., or 150° C.

A tenth embodiment includes the method of any one of the first to the ninth embodiments, wherein the test period comprises a time in a range of from about 1 to about 48 h, from about 1 to about 24 h, from about 2 to about 24 h, from about 2 to about 16 h, from about 3 to about 12 h, from about 3 to about 5 h, greater than or equal to about 1, 2, 3, 4, 5, or 6 h, and/or less than or equal to about 48, 24, 12, 11, 10, 9, 8, 7, 6, 5, 4, 3, 2, or 1 h.

An eleventh embodiment includes the method of any one of the first to the tenth embodiments further comprising determining a settling velocity of the fluid utilizing the sag density.

A twelfth embodiment includes the method of any one of the first to the eleventh embodiments, wherein the determining of the sag density of the fluid sample at the sample location comprises determining the density of the fluid sample at the sample location in situ, without removing the fluid sample from the angled sample chamber.

A thirteenth embodiment includes the method of the twelfth embodiment, wherein the determining of the sag density of the fluid sample at the sample location comprises passing a signal through the angled sample chamber, utilizing a sensor disposed on or within the angled sample chamber, or a combination thereof.

A fourteenth embodiment includes the method of any one of the twelfth and the thirteenth embodiments, wherein the determining of the sag density of the fluid sample at the sample location comprises determining the density of the fluid sample at the sample location during and/or subsequent to the test period.

A fifteenth embodiment includes the method of any one of the first to the eleventh embodiments, wherein the determining of the sag density of the fluid sample at the sample location comprises removing the fluid sample from the angled sample chamber and determining the density of the removed fluid sample ex situ.

A sixteenth embodiment includes the method of the fifteenth embodiment, wherein the determining of the sag density of the fluid sample at the sample location comprises determining the density of the fluid sample via a pressurized density measurement cell (e.g., a pressurized mud balance cell).

A seventeenth embodiment includes the method of any one of the first to the sixteenth embodiments, wherein the sample location comprises a location in a stratum comprising a lower ½, ⅓, or ¼ of a volume of the fluid in the angled sample chamber, or an upper ½, ⅓, or ¼ of the volume of the fluid in the angled sample chamber.

An eighteenth embodiment includes the method of the seventeenth embodiment, wherein the fluid sample comprises from about 10 to about 150, from about 20 to about 125, or from about 50 to about 100 $cm^3$ of the fluid in the stratum comprising the lower ½ of the test volume of the fluid in the angled sample chamber.

A nineteenth embodiment includes the method of any the seventeenth embodiment or the eighteenth embodiment, wherein the stratum comprises a trap located at a lowest region of the angled sample chamber.

A twentieth embodiment includes the method of any one of the first to the nineteenth embodiments, wherein providing the test volume of fluid in the angled sample chamber comprises placing the test volume of fluid in a sample chamber and subsequently angling the sample chamber relative to horizontal to provide the angled sample chamber, or placing a sample chamber at an angle to horizontal to provide the angled sample chamber and subsequently placing the test volume of fluid in the angled sample chamber.

A twenty first embodiment includes the method of any one of the first to the twentieth embodiments further comprising providing an object within the angled sample chamber, wherein the object is configured to disrupt a gelling ability of the fluid.

A twenty second embodiment includes the method of the twenty first embodiment, wherein the object comprises a barstock, a threaded bar, a spiraled spring, a marble, a ball bearing, a rotor, or a combination thereof.

A twenty third embodiment includes the method of the twenty first embodiment or the twenty second embodiment, wherein the object comprises steel.

A twenty fourth embodiment includes the method of any one of the first to the twenty third embodiments further comprising varying a speed and/or direction of the rotating during the test period.

A twenty fifth embodiment includes the method of any one of the first to the twenty fourth embodiments, wherein, during the test period, the fluid in the angled sample chamber is subjected to a (e.g., variable) shear rate in a range of from about 1 to about 45 revolutions per minute about the central axis relative to a point on the outside edge of the chamber.

A twenty sixth embodiment includes the method of the twenty fifth embodiment further comprising adjusting a rate of the rotating of the angled sample chamber during the test period, such that the shear rate is sufficient to break a gel in the fluid.

A twenty seventh embodiment includes the method of any one of the first to the twenty sixth embodiments, wherein the rotating is effected with a roller oven.

A twenty eighth embodiment includes the method of any one of the first to the twenty seventh embodiments, wherein the fluid comprises a weighted wellbore fluid comprising a weighting agent.

A twenty ninth embodiment includes the method of the twenty eighth embodiment, wherein the weighting agent comprises barite.

In a thirtieth embodiment, a method of designing a fluid for sag performance downhole at an operating temperature and an operating pressure comprises: providing the fluid, wherein the fluid comprises a weighting agent; determining one or more properties of the fluid, when homogeneous, wherein the one or more properties comprise an initial density and viscosity of the fluid at a test temperature and a test pressure; predicting a settling velocity of the fluid at the operating temperature and the operating pressure utilizing the initial density, the viscosity, and a sag density, wherein the sag density is determined via the sag performance evaluation method of any of the first to the twenty ninth embodiments, and wherein the operating temperature may or may not be equal to the test temperature and wherein the operating pressure may or may not be equal to the test pressure; and adjusting a composition of the fluid if the predicted settling velocity is above a threshold settling velocity.

A thirty first embodiment includes the method of the thirtieth embodiment, wherein the threshold settling velocity is less than or equal to about 0.01, 0.02, 0.03, 0.04, or 0.05 mm/h.

A thirty second embodiment includes the method of the thirtieth embodiment or the thirty first embodiment, wherein adjusting the composition of the fluid comprises adjusting a particle size and/or concentration of the weighting agent in the fluid.

In a thirty third embodiment, a system for dynamic sag evaluation comprises: a roller oven comprising an angled sample chamber, wherein the angled sample chamber has a central axis, wherein the central axis of the angled sample chamber is angled relative to horizontal; and wherein the roller oven is configured for rotating [e.g., rolling] the sample chamber about the central axis for a test period and at a test temperature; and a density measuring device configured to determine a sag density, wherein the sag density is a density of a fluid sample at a sample location of a stratum in the sample chamber.

A thirty fourth embodiment includes the system of the thirty third embodiment, wherein the central axis is angled from horizontal at an angle in a range of from about 10 to about 85 degrees, from about 15 to about 75 degrees, from about 15 to about 70 degrees, and/or greater than or equal to about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, or 80 degrees.

A thirty fifth embodiment includes the system of the thirty third embodiment or the thirty fourth embodiment, wherein the density measuring device is configured to determine the sag density in situ, without removing the fluid sample from the angled sample chamber, or ex situ, subsequent removing the fluid sample from the angled sample chamber.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Use of the term including should be understood to provide support for the terms comprising, consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method for dynamic sag evaluation of a fluid, the method comprising:
providing a test volume of the fluid into an angled sample chamber, wherein the angled sample chamber is cylindrical, having solid curved walls extending a length between a first end and a second end, wherein the first end is distal the second end and comprises a lowest point of the angled sample chamber, and wherein the angled sample chamber has a central axis, wherein the central axis of the angled sample chamber is angled relative to horizontal at an angle in a range of from about 10 to about 85 degrees, wherein horizontal is parallel to a plane of the horizon;
rotating the sample chamber about the central axis for a test period; and
determining a sag density, wherein the sag density is a density of a fluid sample taken at a sample location within a stratum of the test volume of the fluid present in the angled sample chamber,
wherein the determining of the sag density of the fluid sample at the sample location comprises determining the density of the fluid sample at the sample location in situ, without removing the fluid sample from the angled sample chamber, via a sensor external the angled sample chamber; or
wherein the determining of the sag density of the fluid sample at the sample location comprises removing the fluid sample from the angled sample chamber via the second end and determining the density of the removed fluid sample ex situ.

2. The method of claim 1 further comprising comparing the sag density to an initial density of the test volume of the fluid provided to the sample chamber by determining a density change of the fluid from the initial density of the fluid at the sample location provided in the angled sample chamber to the sag density of the fluid at the sample location subsequent the test period.

3. The method of claim 1, wherein the fluid comprises a weighted wellbore fluid comprising a weighting agent.

4. The method of claim 1 further comprising determining a settling velocity of the fluid utilizing the sag density.

5. The method of claim 1, wherein the determining of the sag density of the fluid sample at the sample location comprises the determining the density of the fluid sample at the sample location in situ, without removing the fluid sample from the angled sample chamber, via the sensor external the angled sample chamber.

6. The method of claim 1, wherein the determining of the sag density of the fluid sample at the sample location comprises the removing the fluid sample from the angled sample chamber and determining the density of the removed fluid sample ex situ.

7. The method of claim 1, wherein the determining the density of the removed fluid sample ex situ comprises determining the density of the fluid sample via a pressurized sag cup.

8. The method of claim 1, wherein the sample location comprises a location in a stratum comprising a lower ½ of a volume of the fluid in the angled sample chamber, or an upper ½ of the volume of the fluid in the angled sample chamber.

9. The method of claim 1, wherein providing the test volume of fluid in the angled sample chamber comprises placing the test volume of fluid in a sample chamber and subsequently angling the sample chamber relative to horizontal to provide the angled sample chamber, or placing a sample chamber at an angle to horizontal to provide the angled sample chamber and subsequently placing the test volume of fluid in the angled sample chamber.

10. The method of claim 1 further comprising providing an object within the angled sample chamber to disrupt a gelling ability of the fluid, wherein the object comprises a threaded bar, a spiraled spring, a marble, a ball bearing, a rotor, or a combination thereof.

11. The method of claim 1 further comprising varying a speed and/or direction of the rotating during the test period.

12. The method of claim 1, wherein, during the test period, the fluid in the angled sample chamber is subjected to a shear rate in a range of from about 1 to about 45 revolutions per minute (rpm) about the central axis relative to a point on an outside edge of the chamber.

13. The method of claim 12 further comprising adjusting a rate of the rotating of the angled sample chamber during the test period, such that the shear rate is sufficient to break a gel in the fluid.

14. The method of claim 1, wherein the stratum is within a trap located at a lowest region of the angled sample chamber.

15. The method of claim 1, wherein the first end is concave.

16. A method of designing a fluid for sag performance downhole, the method comprising:
  providing the fluid, wherein the fluid comprises a weighting agent;
  determining one or more properties of the fluid, when homogeneous, wherein the one or more properties comprise an initial density and viscosity of the fluid;
  predicting a settling velocity of the fluid at an operating temperature and an operating pressure utilizing the initial density, the viscosity, and a sag density, wherein the sag density is determined via a dynamic sag performance evaluation method; and
  adjusting a composition of the fluid if the predicted settling velocity is above a threshold settling velocity,
  wherein the dynamic sag performance evaluation method comprises:
    providing a test volume of the fluid into an angled sample chamber, wherein the angled sample chamber is cylindrical, having solid curved walls extending a length between a first end and a second end, wherein the first end is distal the second end and comprises a lowest point of the angled sample chamber, and wherein the angled sample chamber has a central axis, wherein the central axis of the angled sample chamber is angled relative to horizontal at an angle in a range of from about 10 to about 85 degrees, wherein horizontal is parallel to a plane of the horizon;
    rotating the sample chamber about the central axis for a test period; and
    determining the sag density, wherein the sag density is a density of a fluid sample taken at a sample location within a stratum of the test volume of the fluid present in the angled sample chamber,
  wherein the determining of the sag density of the fluid sample at the sample location comprises determining the density of the fluid sample at the sample location in situ, without removing the fluid sample from the angled sample chamber, via a sensor external the angled sample chamber; or
  wherein the determining of the sag density of the fluid sample at the sample location comprises removing the fluid sample from the angled sample chamber via the second end and determining the density of the removed fluid sample ex situ.

17. The method of claim 16, wherein the threshold settling velocity is less than or equal to about 0.05 mm/h.

18. The method of claim 16, wherein adjusting the composition of the fluid comprises adjusting a particle size and/or concentration of the weighting agent in the fluid.

19. The method of claim 16, wherein the stratum is within a trap located at a lowest region of the angled sample chamber.

20. A system for dynamic sag evaluation, the system comprising:
  a roller oven comprising an angled sample chamber, wherein the angled sample chamber is cylindrical, having solid curved walls extending a length between a first end and a second end, wherein the first end is distal the second end and comprises a lowest point of the angled sample chamber, and wherein the angled sample chamber has a central axis, wherein the central axis of the angled sample chamber is not coincident with horizontal or vertical, wherein horizontal is parallel to a plane of the horizon; and wherein the roller oven is configured for rotating the sample chamber about the central axis for a test period and at a test temperature; and a density measuring device configured to determine a sag density, wherein the sag density is a density of a fluid sample at a sample location of a stratum in the sample chamber.

21. The system of claim 20, wherein the density measuring device is configured to determine the sag density in situ, without removing the fluid sample from the angled sample chamber, via a sensor external to the angled sample chamber, or ex situ, subsequent removing the fluid sample from the angled sample chamber via the second end.

* * * * *